United States Patent
Mohebbi

(10) Patent No.: US 9,130,641 B2
(45) Date of Patent: *Sep. 8, 2015

(54) SHORT-RANGE CELLULAR BOOSTER

(75) Inventor: Behzad Mohebbi, Tustin, CA (US)

(73) Assignee: Nextivity, Inc., San Diego, CA (US)

( * ) Notice: Subject to any disclaimer, the term of this patent is extended or adjusted under 35 U.S.C. 154(b) by 2193 days.

This patent is subject to a terminal disclaimer.

(21) Appl. No.: 11/369,231

(22) Filed: Mar. 2, 2006

(65) Prior Publication Data

US 2006/0172781 A1  Aug. 3, 2006

(51) Int. Cl.
*H04B 7/15* (2006.01)
*H04B 7/155* (2006.01)

(52) U.S. Cl.
CPC ........ *H04B 7/15542* (2013.01); *H04B 7/15535* (2013.01); *H04B 7/15585* (2013.01)

(58) Field of Classification Search
USPC ...................................... 455/11.1, 12.1, 13.1
See application file for complete search history.

(56) References Cited

U.S. PATENT DOCUMENTS

| | | | |
|---|---|---|---|
| 4,083,009 A | | 4/1978 | Bickford et al. |
| 5,847,663 A | | 12/1998 | Chasek |
| 5,875,179 A | | 2/1999 | Tikalsky |
| 5,950,124 A | * | 9/1999 | Trompower et al. ........ 455/422.1 |
| 6,009,324 A | * | 12/1999 | Pravitz et al. .................. 455/423 |
| 6,195,045 B1 | * | 2/2001 | Xu et al. ........................ 342/368 |
| 6,404,775 B1 | * | 6/2002 | Leslie et al. ................... 370/466 |
| 7,477,694 B2 | * | 1/2009 | Sanderford et al. ........... 375/261 |
| 7,480,485 B1 | * | 1/2009 | Oh et al. ............................ 455/7 |
| 2001/0002903 A1 | * | 6/2001 | Chung ........................... 370/286 |
| 2002/0028655 A1 | | 3/2002 | Rosener et al. |
| 2002/0045461 A1 | * | 4/2002 | Bongfeldt ...................... 455/522 |
| 2002/0115409 A1 | | 8/2002 | Khayrallah |
| 2003/0099221 A1 | * | 5/2003 | Rhee .............................. 370/338 |
| 2003/0104781 A1 | | 6/2003 | Son |

(Continued)

FOREIGN PATENT DOCUMENTS

| | | |
|---|---|---|
| EP | 0442617 A1 | 8/1991 |
| EP | 0690637 A2 | 1/1996 |
| JP | 3026031 A | 2/1991 |

(Continued)

OTHER PUBLICATIONS

International Search Report for related patent PCT/US04/29123 performed by International Searching Authority/US on Aug. 29, 2008.

(Continued)

*Primary Examiner* — Patrick Edouard
*Assistant Examiner* — Shantell L Heiber
(74) *Attorney, Agent, or Firm* — Mintz Levin Cohn Ferris Glovsky and Popeo, P.C.

(57) ABSTRACT

A repeater mediates traffic between a network transceiver and a user transceiver in a wireless communication system. The repeater comprises a network unit that maintains a network link with the network transceiver, a user unit that maintains a user link with the user transceiver, a two-way communication pathway between the network unit and the user unit; that facilitate the communication of signals between the network transceiver and the user transceiver in autonomous repeater hops between the network transceiver and the network unit, between the user transceiver and the user unit, and between the network unit and the user unit, and a gain controller that compensates for propagation losses between the network unit and user unit alone.

30 Claims, 22 Drawing Sheets

(56) References Cited

U.S. PATENT DOCUMENTS

| | | |
|---|---|---|
| 2005/0176452 A1 | 8/2005 | Perlman |
| 2006/0046642 A1* | 3/2006 | Bassiri et al. ............... 455/7 |

FOREIGN PATENT DOCUMENTS

| | | |
|---|---|---|
| JP | 3108915 A | 5/1991 |
| JP | 08-047031 A | 2/1996 |
| JP | 8-508377 T | 9/1996 |
| JP | 2003174430 A | 6/2003 |
| RU | 2119714 | 9/1998 |
| WO | WO-94/23504 A1 | 10/1994 |
| WO | WO-02/33996 A1 | 4/2002 |
| WO | WO-02/41521 A2 | 5/2002 |
| WO | WO-03/032524 A1 | 4/2003 |
| WO | WO 2005/008916 * | 1/2005 |

OTHER PUBLICATIONS

Written Opinion for related patent PCT/ US04/29123 performed by International Searching Authority/US on Aug. 29, 2008.

Russian Office Action in connection with counterpart application 2006110628, Decision on Grant a Patent for Invention.

Shoemake, Matthew B., "Wi-Fi (IEEE 802.11b) and Bluetooth: Coexistence Issues and Solutons for the 2.4 GHz ISM Band", Texas Instruments White Paper, Feb. 1, 2001.

EPO Communication pursuant to Article 94(3) EPC dated Apr. 15, 2014 for EP patent application No. 04783394.2.

* cited by examiner

SHORT-RANGE CELLULAR BOOSTER

CROSS REFERENCE TO RELATED APPLICATIONS

This application is a national stage application, filed under 35 U.S.C. §371, of and claims priority to International Application No. PCT/US2004/029123, filed on Sep. 23, 2004, which in turn claims priority to U.S. Provisional Pat. App. Ser. No. 60/499,693, filed on Sep. 23, 2003.

BACKGROUND

The existing cellular networks, such as (Global System for Mobile Communications (GSM) and IS95, are intended to provide a contagious and continuous coverage, so as to support the high terminal mobility expected from such systems. However, despite careful network design, indoor (in-building) coverage, or the coverage of places with high shadowing attenuation (e.g. tunnels) of such networks is often "patchy", with "coverage Holes" at best, and no coverage at worst. The reason for the impaired indoor coverage is that the cellular base stations are usually placed outside buildings, higher than the average building heights, to provide large area coverage. Although the signal may be adequate at "street-level", it is severely attenuated by the building material, reducing the signal power in-building, resulting in the poor converges. Loss of signal power (attenuation) depends on the building material and can be tens of dBs for each wall penetration. The problem is exacerbated in the $3^{rd}$ generation systems such as Wideband Code Division Multiple Access (WCDMA) and cdma2000, as these new systems have the capability of high data transmission, which results in lower information bit energy ($E_b$), and much reduced link budget and cell footprint. Currently, the common solutions for providing indoor coverage are:
  I) More outdoor base stations in the same geographical area, supporting smaller cell sizes.
  II) Microcells.
  III) Picocells (in-building cells).
  IV) Conventional repeaters.

Clearly all the above solutions (except the repeater solution) are very expensive and involve extensive investment in the cellular network infrastructure and are much more complex in planning and operation. There are other solutions such as repeaters that can be used to boost the signal in a given geographical area.

The repeater solution, although cheaper than a base station, has several drawbacks. These outdoor repeaters are still too expensive for a private user, and involve careful planning. Most use large directional antennas, or additional backhaul frequencies to reduce antenna gain specifications, which results in lower spectral efficiency and are capacity limited. The repeaters often cause increased interference in the network, as they are outdoor devices, similar to base stations, and hence are not popular as a viable solution for providing high performance indoor coverage. The indoor repeaters are still cheaper than the outdoor version, but typically involve installation of high directional antennas on the roof, and ensured antenna isolation, creating costly demand for skilled installation and operation. Therefore, the system generally remains too complicated for an unskilled user and not sufficiently inexpensive for usage in a very localized coverage area.

SUMMARY

In accordance with an embodiment of a communication device, a repeater mediates traffic between a network transceiver and a user transceiver in a wireless communication system. The repeater comprises a network unit that maintains a network link with the network transceiver, a user unit that maintains a user link with the user transceiver, a two-way communication pathway between the network unit and the user unit; that facilitate the communication of signals between the network transceiver and the user transceiver in autonomous repeater hops between the network transceiver and the network unit, between the user transceiver and the user unit, and between the network unit and the user unit, and a gain controller that compensates for propagation losses between the network unit and user unit alone.

BRIEF DESCRIPTION OF THE DRAWINGS

Embodiments of the invention relating to both structure and method of operation, may best be understood by referring to the following description and accompanying drawings whereby.

DETAILED DESCRIPTION

The system disclosed herein provides better, and localized indoor coverage without causing excess interference in the network, usage of costly equipment or network planning. The system increases the overall network capacity, reducing the mobile and BTS transmit power, increasing the battery life and reducing the "harmful" radiation to the user.

Descriptions of the illustrated embodiments are based on a GSM (Global System for Communications) network, which is a TDMA based system operating at various spectrum bands, depending on the country and the region's regulations. However, the disclosure, with minor modifications, is equally applicable to any other cellular system, including (but not limited to) IS95, cdma2000 and WCDMA, and wireless LAN systems such as 802.11a, b, and g. Although the description is given for cellular systems, with minor modifications, it can equally be applied to other systems such as GPS or any other system that uses signal-boosting capability. The operating frequency can be at any desired part of communications spectrum used for mobile communications (e.g. PCS 1900, or DCS1800 or GSM900 or UMTS 2000, ISM or UNII band). The description here is only intended as an example and as such utilization of the booster is not only limited to the in-building coverage and can be used in other places such as trains, planes, cars, tunnels, etc. Also, the example may not include all minute or unimportant design details. Units and sub-units discussed and explained hereafter meet regulations of the respective licensed and unlicensed band of operation. Therefore, for the different example implementations and embodiments disclosed, specifications including maximum transmit power, spectral mask, out of band radiation, and others for transmitters, receivers, repeaters and boosters, are met for both licensed and unlicensed bands of operation.

Analogue Implementation Example

Figure 1:
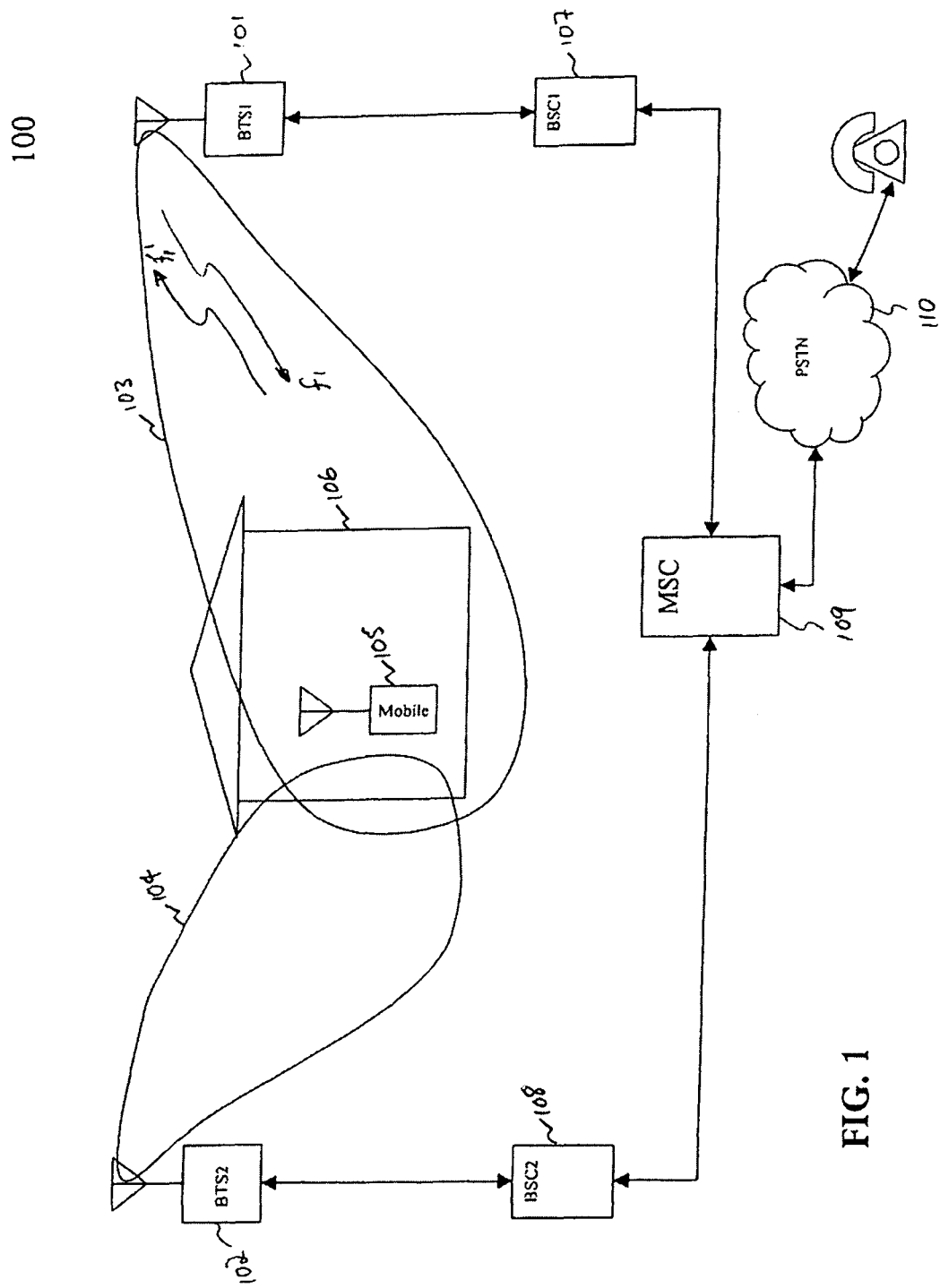
FIG. 1 is a schematic block diagram illustrating an embodiment of a cellular network with two base stations.

FIG. 1 shows a cellular network 100 with two base stations (BTS1 (101) & BTS2 (102)). A typical network supports more than two base stations. The disclosed system may be applied in any size network, regardless of the supported number of base stations. BTS1 101 is connected to Base Station Controller BSC1 107. BTS2 102 is connected to Base Station Controller BSC2 108. BTS2 102 can also be connected to Base Station Controller BSC1 107, instead of BSC2 108. BSC1 107 is connected to Mobile Switching Center MSC 109. BSC2 108 is connected to MSC 109, or instead may be connected to another MSC in the network. MSC 109 is connected to PSTN 110. BTS1 101 has an associated coverage area 103. BTS2 102 has an associated coverage area 104. These coverage areas may or may not overlap. However, usually the network is planned such that there is considerable overlap, to facilitate handoffs. The mobile terminal 105 is inside building 106, in the coverage area 103 communicating with BTS1 101, using a traffic channel transmitted at around frequency f1 in the forward-link and its associated reverse-link frequency, f1'. The traffic channel can be one of the available time slots on the BCCH carrier, or may be on a TCH carrier, where frequency hopping may be used to reduce interference. Mobile terminal 105 may or may not be in coverage area 104, but the mobile unit 105 is well within the coverage area 103 and average signal power from BTS1 101 is much stronger than the average signal power from BTS2 102, within the building 106, and the locality of mobile unit 105. Root-mean-square (rms) forward-link signal level $\hat{S}_1$, outside the building 106 is higher than the rms signal level $\hat{S}_2$ inside the building by the wall penetration loss α. The loss α may be such that $\hat{S}_2$ is not at sufficiently high level for the User unit 105 to maintain reliable communication with BTS1 101, or BTS2 102, or both BTS1 101 and BTS2 102. Further, the signal level $\hat{S}_2$ may be such that mobile unit 105 may have difficulty to setup and maintain a communication link with BTS1 101 or BTS2 102, or both BTS1 101 and BTS2 102, or the communication link does not have the desired performance and reliability, in all or some of the in-building areas. The coverage problem inside the building 106 may be solved by more transmit power from BTS1 101 in the down-link to combat the signal loss, by the wall penetration loss, a. The r.m.s. reverse-link signal level $\hat{S}_1$, inside the building 106 is higher than the r.m.s. signal level $\hat{S}'_2$, outside the building, by the wall penetration loss α'. The loss α' may be such that $\hat{S}'_2$ is not at sufficiently high level for the User unit 105 to maintain reliable communication with BTS1 101, or BTS2 102, or both BTS1 101 and BTS2 102. Further, the signal level $\hat{S}'_2$ may be such that mobile unit 105 may have difficulty to setup and maintain a communication link with BTS1 101 or BTS2 102, or both BTS1 101 and BTS2 102, or the communication link does not have the desired performance and reliability, in all or some of the in-building areas. The coverage problem inside the building 106 may be solved by more transmit power from mobile unit 105 in the up-link to combat the signal loss, by the wall penetration loss, α'. Usually the forward and reverse link frequency pairs are sufficiently close, such that a level is substantially similar to α' level.

Figure 2:
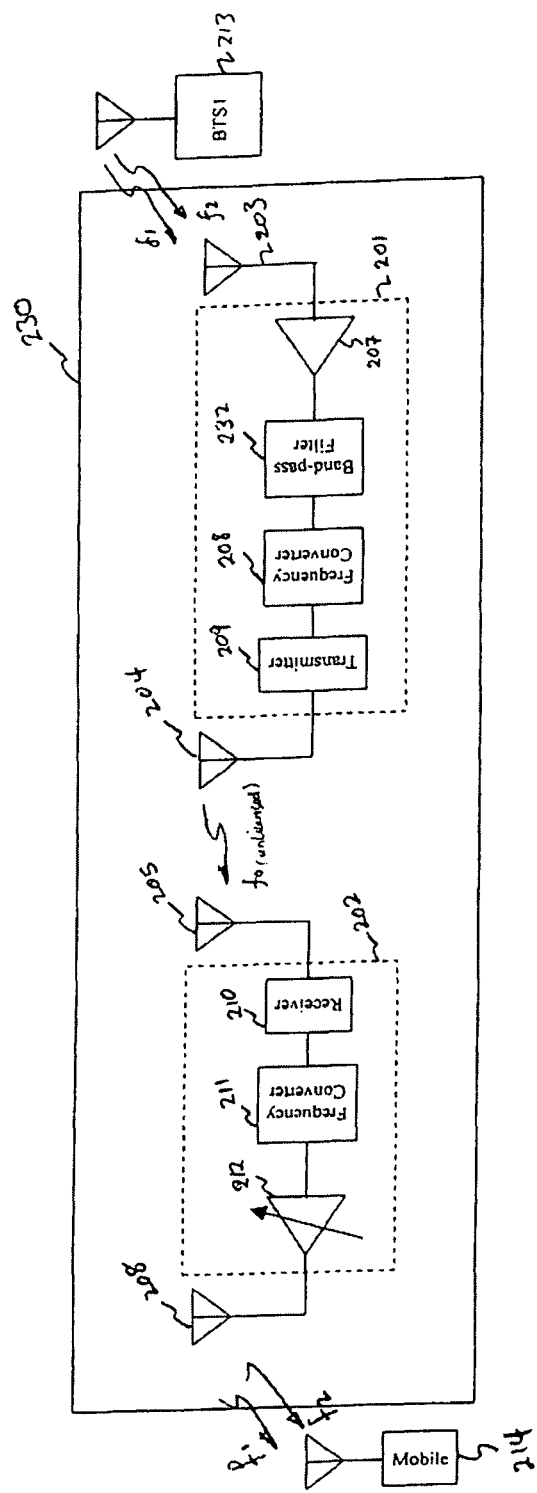
FIG. 2 is a schematic block diagram depicting an embodiment of a forward-link part of a repeater.

FIG. 2 depicts a forward-link part 230 of the repeater 200. The forward-link portion 230 in a simple form supplies improved indoor coverage by boosting the signal level in building in the forward-link of the cellular network. BTS1 213 has a BCCH radio channel (beacon channel) transmitted substantially close to f1. BTS1 213 is in communications with the mobile unit 214 at a frequency substantially close to f1 (the BCCH carrier frequency) or another carrier frequency, f2, that may or may not be frequency hopping. There may or may not be other frequencies that are transmitted by BTS1 213, or other base stations in the same area, which are not shown in the FIG. 2.

The device has two separate units, the "Forward-link Network unit" 201, which is placed where good signal coverage exists, indoor or outdoors, and the "Forward-link User unit" 202, which is placed where good signal coverage does not exist, indoor or outdoors. The Forward-link Network unit 201 is connected to an antenna 203, tuned to operate at the cellular network operating frequency band. The Forward-link Network unit 201 is also connected to an antenna 204 tuned to operate at a suitable Unlicensed National Information Infrastructure (known as U-NII) bands, where the system is designed to operate at U-NII spectrum bands. Subject to the relevant regulations, the system can also be designed to operate at Unlicensed Personal Communications Services (U-PCS) band or at Industrial, Scientific and Medical (ISM) band of frequencies. The choice of the unlicensed frequency depends on the design of the equipment and the system specification. Frequencies defined in the portion of the radio spectrum known as U-NII bands may be implemented in some embodiments. Some design modifications are useful, for ISM band operation. The modifications are related to the minimum spreading factor of 10 specified for the ISM band operation, and the maximum allowed transmit power. If the system is designed to operate in ISM band, the signal may use further spread spectrum modulation/demodulation and other modifications to meet FCC 47 CFR Part-15, subpart E specifications.

The frequency bands defined for U-NII operations are as follows:
1) 5.15-5.25 GHz @ Max Transmit power of 2.5 mW/MHz
2) 5.25-5.35 GHz @ Max Transmit power of 12.5 mW/MHz
3) 5.725-5.825 GHz @ Max Transmit power of 50 mW/MHz Any unlicensed operation in U-NII band is allowed, as long as the signal transmissions meet FCC 47 CFR Part-15. So operation of the described booster generally complies with standards of the FCC 47 CFR Part-15 (subpart E for U-NII frequencies). Regulations commonly specify transmit power, emission limits, and the antenna gain limits and are implemented for an acceptable device.

The "Forward-link User Unit" 202 is connected to an antenna 205 tuned to operate in the same frequency band as antenna 204, which is U-NII band in some embodiments. The Forward-link User unit 202 is also connected to an antenna 206 tuned to operate at the cellular network operating band.

Antenna 203 is connected to a (Low Noise Amplifier) LNA unit 207, which is further connected to a bandpass filter 232. LNA unit 207 may be a high performance amplifier, with a typical gain of 15 dB and a noise figure of 1.5 dB with sufficient bandwidth to cover the appropriate portion of the spectrum. The bandpass filter 232 can be designed to pass all or a desired part of the interested cellular spectrum, or can be a bank of overlapping bandpass filters, covering the full spectrum of the interested cellular system, with a RF switch, such that the desired band and bandwidth can be selected. The bandpass filter 232 is connected to frequency converter 208. The frequency converter 208 is capable of converting the cellular network operating spectrum band to a desirable part of the U-NII spectrum, and includes components such as mixers and filters for correct operation. The frequency converter 208 is connected to the Forward-link Network unit transmitter 209. The transmitter unit 209 is designed to operate in U-NII band and conforms to the FCC 47 CFR Part-15, subpart E regulations, and can be as simple as a single amplifier operating at the desirable U-NII operation band, or more complex transmitter with amplifiers and filters, or even a WLAN transmitter such as 802.11a. The transmitter unit 209 is connected to antenna 204.

Antenna 205 is connected to the Forward-link User unit receiver 210, which is designed to receive the signal transmitted by unit 201. The receiver 210 which is connected to frequency converter 211, can be as simple as a single LNA operating at desirable U-NII band of device operation, or it can be better designed with additional functionalities such as variable attenuator and variable channel select filters, or even a WLAN receiver such as 802.11a (where the transmitter part of 802.11a is used in the Network unit 209). Frequency converter unit 211, which is connected to receiver unit 210 and variable gain amplifier unit 212, converts the input signals, from U-NII band, to the cellular network operating frequencies, and includes all components such as mixers and filters for correct operation. The frequency converter unit 211 performs the opposite conversion operation of the frequency converter unit 208, and includes all components such as mixers and filters for correct operation. The frequency converter 211 is connected to the Variable Gain (VG) amplifier 212, operating at the cellular network operating frequency band. The variable gain amplifier 212 is connected to antenna 208. Antenna 208 will be transmitting signals with substantially similar frequencies to the frequencies transmitted by base station 213, and meets cellular system specifications.

The signal radiated by antenna 208, which is an amplified repeated version of the original incident signal received by antenna unit 203, will experience some loss in the power level, before returning and re-entering the antenna 203 again. The re-entered signal into antenna 203 is termed "Down-link Returned-Signal" hereafter. The ratio of the r.m.s. signal value of the Down-link Returned-Signal to the r.m.s. value of the original incident signal at the output of the antenna 203 terminator, with all the system and propagation path delays between the antenna units 208 and 203 removed, is the Down-link Returned-Signal path loss, and is termed here as the "Down-link System Path Loss" and referred to as $PL_{d1}$.

Further, the "Down-link System Link Gain", which is here referred to as $G_{d1}$, is defined as "the ratio of the r.m.s. signal value at the input to the antenna 208 terminator, to the r.m.s. signal value, at the antenna 203 terminator, where the Down-link System Path Loss, $PL_{d1}$, as defined above, is infinite (i.e. no EM coupling path between antenna 208 and antenna 203), and all the system and propagation path delays (from antenna 203, through the system to antenna 208) are removed".

The variable gain amplifier unit 212 gain is set such that Down-link System Link Gain, $G_{d1}$, is less than the Down-link System Path Loss, $PL_{d1}$, by $dg_{d1}$, so as to avoid a "positive feed-back" loop in the system, i.e.

$$G_{d1}=PL_{d1}-dg_{d1}(dB)$$

Note that all values of $PL_{d1}$, $G_{d1}$, and $dg_{d1}$ are all in dB. The value of $dg_{d1}$ ranges from 0 to $PL_{d1}$, and can be assumed to be 3 dB for the purposes of the description here. However, it is possible to select better values for $dg_{d1}$, where the system performance is optimized further.

Figure 3:
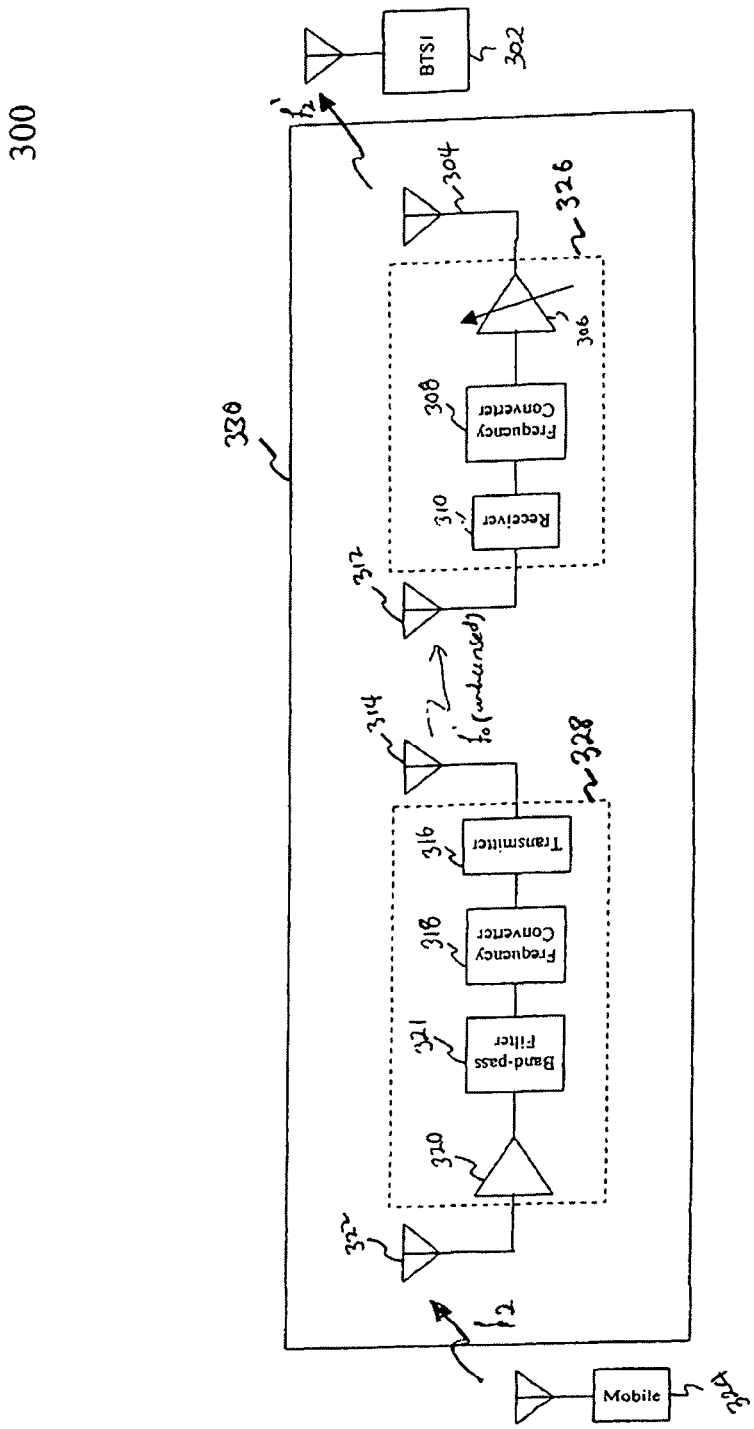
FIG. 3 is a schematic block diagram showing an embodiment of a reverse-link part of a repeater.

FIG. 3 depicts an embodiment of the reverse-link part 330 of a repeater 300. The reverse-link portion 330 in a simple form improves indoor coverage by boosting signal level in building in the reverse-link of the cellular network to such level that attains acceptable link performance. BTS1 302 has a BCCH radio channel (beacon channel) transmitted substantially close to f1, and a frequency pair, f'1 on the reverse-link. BTS1 302 is in communications with the mobile unit 324 at a frequency substantially close to f'1 (the BCCH carrier frequency) or another carrier frequency, f'2, that may or may not be frequency hopping. There may or may not be other frequencies that are transmitted by BTS1 302, or other base stations in the same area, which are not shown in the FIG. 3.

The device has two separate units, the "Reverse-link Network unit" 326, which is placed where good signal coverage exists, indoor or outdoors, and the "Reverse-link User unit" 328, which is placed where good signal coverage does not exist, indoor or outdoors. The Reverse-link Network unit 326 is connected to an antenna 304, tuned to operate at the cellular network operating frequency band. The Reverse-link Network unit 326 is also connected to an antenna 312 tuned to operate at a suitable Unlicensed National Information Infrastructure (U-NII) bands, where the system is designed to operate at U-NII bands. Subject to the relevant regulations, the system can also be designed to operate at Unlicensed Personal Communications Services (U-PCS) band or at Industrial, Scientific and Medical (ISM) band of frequencies. The choice of the unlicensed frequency depends on the design of the equipment and the system specification. Frequencies defined in the portion of the radio spectrum known as U-NII bands may be used in some system designs. Some design modifications are used for ISM band operation. The modifications are related to the minimum spreading factor of 10 used for ISM band operation, and the maximum allowed transmit power. If the system is designed to operate in ISM band, the signal uses further spread spectrum modulation/demodulation and other modifications to meet the FCC 47 CFR Part-15, subpart E specifications.

The frequency bands defined for U-NII operations are as follows:
1) 5.15-5.25 GHz @ Max Transmit power of 2.5 mW/MHz
2) 5.25-5.35 GHz @ Max Transmit power of 12.5 mW/MHz
3) 5.725-5.825 GHz @ Max Transmit power of 50 mW/MHz Any unlicensed operation in U-NII bands is allowed, as long as the signal transmissions meet with FCC 47 CFR Part-15. Operation of the illustrative booster meets specifications of FCC 47 CFR Part-15 (subpart E for U-NII frequencies).

The "Reverse-link User Unit" 328 is connected to an antenna 314 tuned to operate in the same frequency band as antenna 312, which is U-NII band for example. The Reverse-link User unit 328 is also connected to an antenna 322 tuned to operate at cellular network operating band.

Antenna 322 is connected to a LNA unit 320, which is further connected to a bandpass filter 321. LNA unit 320 may be a high performance amplifier with a typical gain of 15 dB and a noise figure of 1.5 dB with sufficient bandwidth to cover the appropriate portion of the spectrum. The bandpass filter 321 can be designed to pass all or a desired part of the cellular spectrum, or can be a bank of overlapping bandpass filters, covering the full spectrum of the interested cellular system, with a RF switch, such that the desired band and bandwidth can be selected. The bandpass filter 321 is connected to frequency converter 318. The frequency converter 318 is capable of converting the cellular network operating spectrum band to a desirable part of the U-NII spectrum, and includes all components such as mixers and filters for correct operation. The frequency converter 318 is connected to the Reverse-link User unit transmitter 316. The transmitter unit 316 is designed to operate in U-NII band and conforms to the FCC 47 CFR Part-15, subpart E regulations, and can be as simple as a single amplifier operating at the desirable U-NII operation band, or a more complex transmitter with amplifiers and filters or even a WLAN transmitter such 802.11a. The transmitter unit 316 is connected to antenna 314. The desired portion of the U-NII band of operation for the reverse-link part of the booster is different to the desired portion of the U-NII band of operation for Forward-link part of the booster, and sufficiently apart, so that no substantial interference is experienced from the operation of one link, to the other.

Antenna 312 is connected to the Reverse-link Network unit receiver 310, which is designed to receive the signal transmitted by unit 328. The receiver 310 which is connected to frequency converter 308, can be as simple as a single LNA operating at desirable U-NII band of device operation frequency, or it can be better designed with additional functionalities such as variable attenuator and variable channel select filters or even a WLAN receiver such as 802.11a (where the transmitter part of 802.11a is used in the User unit 316). Frequency converter unit 308, which is connected to receiver unit 310 and variable gain amplifier unit 306, converts the input signals, from U-NII band, to the cellular network operating frequencies, and includes all components such as mixers and filters for correct operation. The frequency converter unit 308 performs the opposite conversion operation of the frequency converter unit 318. The frequency converter 308 is connected to the variable gain amplifier 306, operating at the cellular network operating frequency band. The variable gain amplifier 306 is connected to antenna 304. Antenna 304 will be transmitting signals with substantially similar frequencies to the frequencies transmitted by mobile unit 324.

The signal radiated by antenna 304, which is an amplified repeated version of the original incident signal received by antenna unit 322, will experience some loss in the power level, before returning and re-entering the antenna 322 again. The re-entered signal into antenna 322 is termed "Up-link Returned-Signal" hereafter. The ratio of the r.m.s. signal value of the Up-link Returned-Signal, to the r.m.s. value of the original incident signal, at the output of the antenna 322 terminator, with all the system and propagation path delays between the antenna units 304 and 322 removed, is the Up-link Returned-Signal path loss, and is termed here as the "Up-link System Path Loss" and referred to as $PL_{u1}$.

Further, the "Up-link System Link Gain" which here is referred to as $G_{u1}$, is defined as "the ratio of the r.m.s. signal value at the input to the antenna 304 terminator, to the r.m.s. signal value, at the antenna 322 terminator, where the Up-link System Path Loss, $PL_{u1}$, as defined above, is infinite (i.e. no EM coupling path between antenna 304 and antenna 322), and all the system and propagation path delays (from antenna 322, through the system to antenna 304) are removed".

The variable gain amplifier unit 306 gain is set such that Up-link System Link Gain, $G_{u1}$, is less than the Up-link System Path Loss, $PL_{u1}$, by $dg_{u1}$, so as to avoid a "positive feed-back" loop in the system, i.e.

$$G_{u1}-PL_{u1}-dg_{u1}(dB)$$

Note that all values of $PL_{u1}$, $G_{u1}$, and $dg_{u1}$ are in dB. The value of $dg_{u1}$ ranges from 0 to $PL_{u1}$, and can be assumed to be 3 dB for the purposes of the description here. However, it is possible to select better values for $dg_{u1}$, where the system performance is optimized further.

Usually the forward and the reverse links frequency pairs are sufficiently close, such that $G_{u1}$ level is substantially similar to $G_{d1}$ level, and $PL_{u1}$ level is substantially similar to $PL_{d1}$ level and $dg_{u1}$ level is substantially similar to $dg_{d1}$ level.

The unique booster unit identity code and optionally the device location can be transmitted to the cellular network. The information can be used to locate a user in an indoor environment, for example by generating a heavily coded (protected), low bit rate data containing a long known preamble, the unique identity code, optionally the longitude, and the latitude of the reverse-link Network unit 326. The information can then be pulse-shaped for low spectral leakage and superimposed on the reverse-link signal of a given channel by an appropriate modulation scheme, within the reverse-link Network unit 326. The choice of the modulation scheme depends on the operating cellular system. For example, for GSM, which enjoys a constant envelope modulation such as GMSK, amplitude modulation (with low modulation index) can be used. For CDMA systems with fast reverse-link power control, DBPSK can be used as the modulation scheme. Extraction of information from the received channel signal at base station may involve base station receiver modifications, but does not effect the normal operation of the cellular link.

Figure 4:
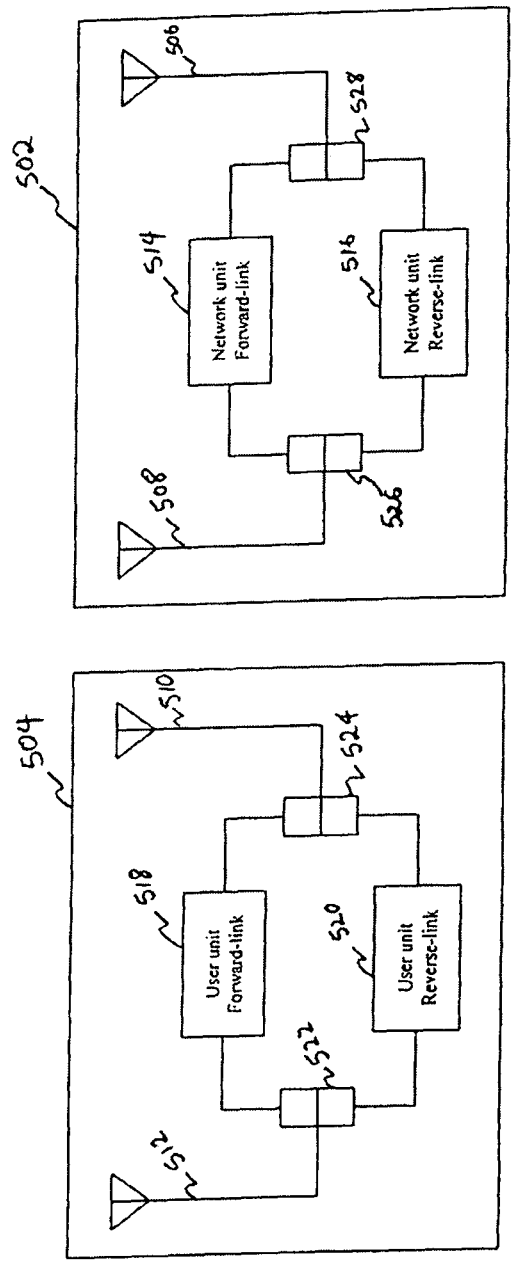
FIG. 4 is a schematic block diagram illustrating an embodiment of a system including a Network unit and a User unit.

FIG. 4 shows an embodiment of a system 500 including the Network unit 502, together with the User unit 504 in the same diagram. The Forward-link Network unit 514 (201 in FIG. 2) and the Reverse-link Network unit 516 (326 in FIG. 3) are now in one unit, referred to hereafter as the Network unit 502. The Forward-link User unit 518 (202 in FIG. 2) and the Reverse-link User unit 520 (328 in FIG. 3) are now in one User unit, referred to hereafter as the User unit 504. In FIG. 4, the transmit/receive antenna 203 in FIG. 2 and transmit/receive antenna 304 in FIG. 3 are replaced by a single antenna 506 and duplex filter 528. The duplex filter unit 528 is designed for optimum performance, and meets specifications for cellular operation. Also, the transmit/receive antenna 204 in FIG. 2 and transmit/receive antenna 312 in FIG. 3 are replaced by a single antenna 508 and duplex filter 526. Further, the transmit/receive antenna 205 in FIG. 2 and transmit/receive antenna 314 in FIG. 3 are replaced by a single antenna 510 and duplex filter 524 in FIG. 4. Equally, the transmit/receive antenna 208 in FIG. 2 and transmit/receive antenna 322 in FIG. 3 are replaced by a single antenna 512 and duplex filter 522 in FIG. 4. The duplex filter unit 522 is designed for optimum performance, and complies with specifications for cellular operation. GSM system is a FDD system, and as such reverse-link frequencies are different to that of the forward-link frequencies. In such system a duplex filter provides appropriate functionality. However, if the Network unit 502 and the User unit 504 are designed for a TDD system, the duplexers 528 and 522 can be replaced by hybrid combiners or "circulators". However, duplexers 526 and 524 are still used, since forward-link and reverse-link frequencies in the U-NII band are kept separate (i.e. FDD). With minor modifications, it is possible that, instead of antennas 508 and 510, a coaxial cable (such as RG58 or IS inch heliax) is used to connect the Network unit 502 to the User unit 504. In such an arrangement, where coaxial cable is used for the link connection, although still possible, up-conversion to U-NII bands is superfluous, and the system can operate with the Forward and reverse-link signals kept at original cellular frequencies.

The described booster system typically operates satisfactorily in limited scenarios. To ensure the correct operation of the booster system in all propagation and operating conditions, several features may be included in the system design.

1. Since both the Network unit 502 and the User unit 504 are for most time stationary relative to each other, and possibly other network elements such as base stations, antenna (space) diversity is used for transmit and receive operations.

2. The signals transmitted by antenna 506, in the reverse-link, are substantially at the same operating frequency band as the reverse-link signals received by antenna unit 512. Equally, the signals transmitted by antenna 512, in the forward-link, are substantially at the same operating frequency band as the forward-link signals received by antenna unit 506. As the signals received by the Forward-link Network unit 514 are transmitted to Forward-link User unit 518, via antenna units 508 and 510, and further, as the signal received by the Forward-link User unit 518 is then amplified before the retransmission via antenna unit 512, a feed-back loop, through the antennas 512 and 506, between the two Forward-link Network unit 502 and Forward-link User unit 518 exists. Any gain in the loop causes "positive feed-back", which results in unstable operation, a phenomenon that is also true for reverse-link operation of the Network unit 502 and the User unit 504. To keep the two feed-back loops in a stable operating region, in the forward-link the Down-link System Link Gain, $G_{d1}$, is less than the Down-link System Path Loss, $PL_{d1}$, by $dg_{d1}$, so as to avoid a "positive feed-back" loop in the system, i.e. $G_{d1}=PL_{d1}-dg_{d1}$ (dB). Equally, in the reverse-link, the Up-link System Link Gain, $G_{u1}$, is less than the Up-link System Path Loss, $PL_{u1}$, by $dg_{u1}$, so as to avoid a "positive feed-back" loop in the system. i.e. $G_{u1}=PL_{u1}-dg_{u1}$ (dB). The propagation losses, $PL_{u1}$ and $PL_{d1}$, may be due to shadowing, distance, antenna radiation pattern and multipath propagation as well as wall penetration loss. The levels of these propagation losses, $PL_{u1}$ and $PL_{d1}$, are not readily available and are measured.

3. Continuous and correct operation of the Network unit 502 and User unit 504 is monitored. Any operational problem at the Network unit 502 or the User unit 504 can result in unwanted transmissions in either forward or reverse (or both) links. Further, the system may rely on radio channels operating at unlicensed frequency bands, which are prone to interference from other unlicensed devices. Also, operation of the Network unit 502 and the User unit 504 is coordinated. Therefore a control-signaling channel is inserted between the two Network 502 and the User 504 units.

4. The local oscillators of the network unit 502 and the User unit 504 are substantially similar in frequency, as any large frequency error between the Network 502 and the User 504 units will result in an unacceptable cellular link performance. In some embodiments, a pilot signal can be transmitted in a control link from the network unit 502 to the user unit 504 and used for synchronization of local oscillators of the two units. In other examples, an electric power supply waveform can be used for synchronization of local oscillators in the two units.

Advanced Features

Illustrative advanced features include design solutions that are useful in countering the enumerated problems.

Figure 5:
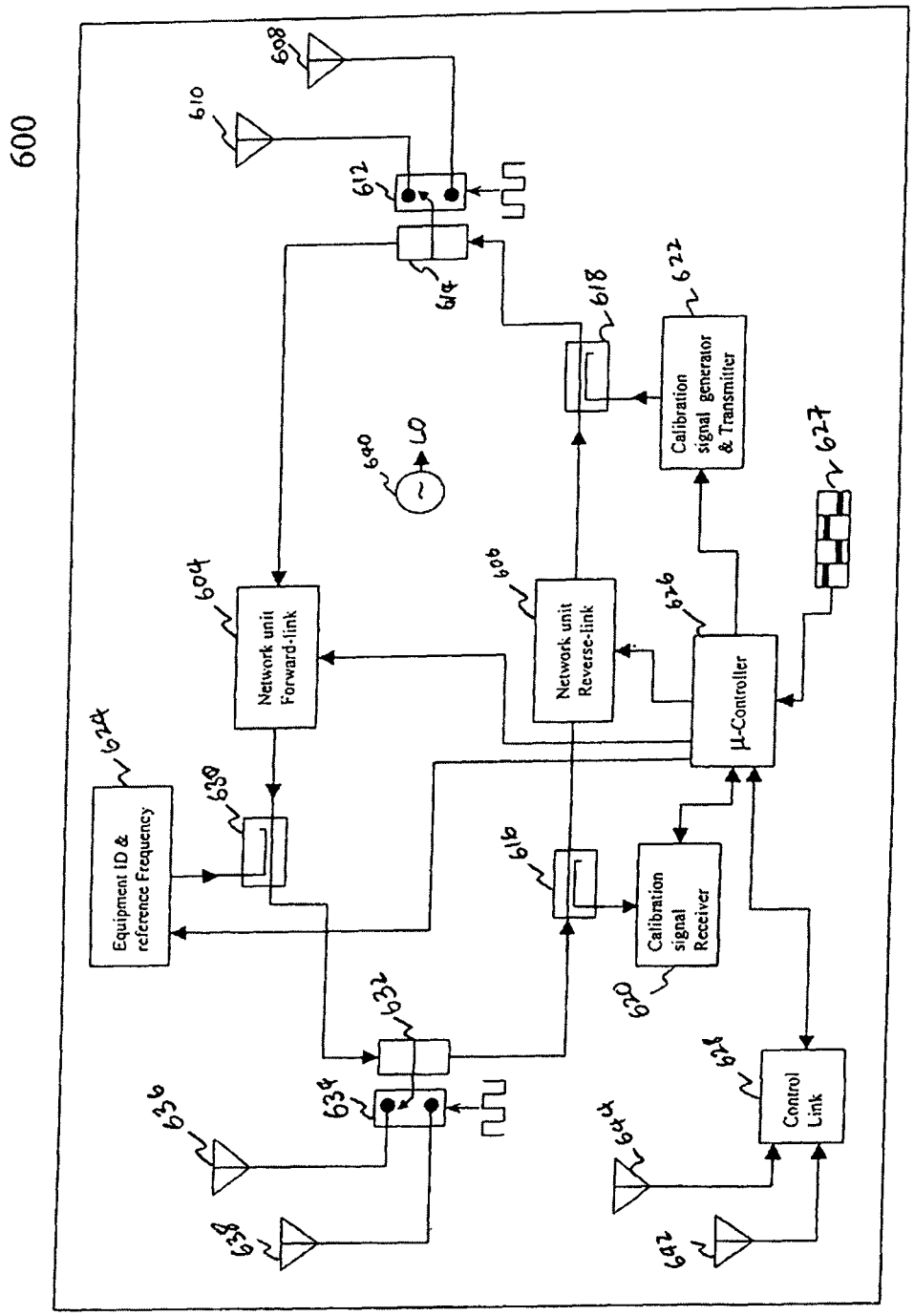
FIG. 5 is a schematic block diagram that illustrates an embodiment of a system including a Network unit implementing antenna diversity.

FIG. 5 shows a system 600 including the Network unit 602 (502 in FIG. 4) with the new design features included. Two antennas 610 and 608 are used for antenna diversity, instead of a single antenna 506 in FIG. 4. Also two antennas 636 and 638 are used for antenna diversity, instead of a single antenna 512 in FIG. 4. Although any diversity-combining scheme such as Maximal Ratio Combining, etc. can be used for the receiver chain, and transmit diversity schemes such as random phase change in one or both antennas for the transmitter chain, a simple scheme that is based on antenna switched diversity with "continuous switching" strategy is suggested here. The continuous switching strategy, with the switching rate selected for optimum performance (e.g. at, or twice, the GSM Timeslot rate which is 4.6 msec), can be used for both transmit and receive operation, and will result in a nominal average transmit/receive signal power, provided the antennas are placed sufficiently apart. The continuous-switch diversity scheme is also simple to implement, using only a simple RF switch at the antenna ports. Therefore, the RF switch 612 connected to antennas 610 and 608 and the duplex filter 614 will provide switching operations for the cellular transmit/receive operation of the Network unit 602. Also the RF switch 634, connected to antennas 636 and 638 and the duplex filter 634, will provide switching operations for the U-NII band transmit/receive operation of the Network unit 602. The duplex filter 614 is connected to Forward-link Network unit 604 (514 in FIG. 4), and the Reverse-link Network unit 606 (516 in FIG. 4) via the directional coupler 618. Directional couplers may be 17 dB directional couplers. Also, the duplex filter 634 is connected to Forward-link Network unit 604 via the directional coupler 630, and Reverse-link Network unit 606 via the directional coupler 616. It is also possible to use hybrid combiners instead of the directional couplers 618, 630 and 616. It is also possible, and is more desirable, to place the Reverse-link Network receiver unit 310 internal LNA amplifier, before the directional coupler 616 (or the hybrid combiner replacement) in diagram 600.

A calibration signal generator/transmitter unit 622 is coupled to the reverse-link transmitter path of the Network unit 602, via the directional coupler 618. The unit 622 will provide a calibration signal, at the desired power levels, which is used to establish the level of the above-mentioned Up-link System Path Loss, $PL_{u1}$, which exists between the Network unit 602 (502 in FIG. 4) and the User unit 702 in FIG. 6 (504 in FIG. 4). The calibration signal generated by unit 622 is transmitted via the diversity antennas 610 and 608 at a set transmit level which is substantially below any expected signal level from cellular network (e.g. 20 dB below the minimum expected cellular signal level). The calibration signal generated by unit 622 is a direct-sequence spread spectrum signal modulated by a known Pseudo Random (PN) code with a known code phase (referred to hereafter as "own code" phase) and with a chipping rate comparable to the forward and reverse links of the Network unit 602 and User unit 702 (in FIG. 6) operating bandwidths. The code phases are selected such that the minimum code phase difference is larger than the maximum expected path delay (measured in multiple number of chips), and after that the code phases should be multiple integer of the minimum code phase. The calibration signal receiver unit 620 which is coupled to the reverse-link receive path of the Network unit 602, by directional coupler 616, using the known PN code and the transmit code phase is then capable of detecting and demodulating the calibration signal transmitted by unit 622, which has entered the reverse-link path via the mentioned closed-loop mechanism that exists between the Network unit 602 and the User unit 702 in FIG. 6 (504 in FIG. 4). The calibration signal receiver unit 620 is capable of establishing the received signal strength, which is then used to estimate the Up-link System Path Loss, $PL_{u1}$, that exists between the Network unit 602 (502 in FIG. 4) and the User unit 702 in FIG. 6 (504 in FIG. 4). The calibration signal receiver unit 620 includes many sub-units, including a frequency converter similar to frequency converter unit 308 (in FIG. 3), to return the calibration signal, to its original operating frequency. The PN code phase can be assigned uniquely, or drawn according to a random algorithm, such that the probability of two units having the same code phase can be very low. Other code offset assignment strategies are also possible, such as dynamic assignment, where the code offset is selected, if no such offset was detected in that geographical area. The feature enables the calibration signal receiver 620 to be able to scan and receive "other code" phases, and hence establishing if there is any other signal coupling to or from other units, that may be operating in the same geographical area. Further, more than one code phases can be used, to establish the Up-link System Path Loss, $PL_{u1}$, so that the probability of detection by other systems is increased. The PN code used for the calibration signal can be modulated with information about the identity of the Network unit 602. The carrier frequency of the transmitted calibration signal may be at the operating cellular frequency band. However, carrier frequencies in other bands, such as ISM band at 2.4 GHz, may be used for transmission of the calibration signal so that the calibration signal generator and transmitter 622 carrier frequency are placed as near as possible to the operating frequency band. The chipping rate and the transmit power of the calibration signal PN code is configured so that the calibration signal complies with the FCC 47 CFR Part-15 rules. Although the mentioned ISM band is not the same as the cellular operating band, nevertheless, the band is sufficiently close to enable the system to establish the antenna coupling and the Up-link and Down-link System Link Gains, ($G_{u1}, G_{d1}$), at the cellular operating band (the instantaneous amplitude and phase values are no longer relevant operating at ISM band). Any antenna and propagation differences in average signal power between the ISM and cellular operating bands can be investigated in the design phase and taken into account in the final system design. The calibration signal generator and transmitter unit 622, and the calibration signal receiver 620, are both in the Network unit 602, operating in the desired cellular band. However, one or both of the units including calibration signal generator and transmitter unit 622, and the calibration signal receiver 620, can also be placed in the User unit 702, with certain modifications and considerations. In some cases, a calibration mechanism for the forward-link, similar to the one described for the reverse-link, includes parts such as the unit, 622, 618, 616 and 620, which can be placed in the User unit 702.

Further, it can be assumed that Up-link System Path Loss, $PL_{u1}$, and the Down-link System Path Loss, $PL_{d1}$, are the same, i.e. $PL_{d1} \approx PL_{u1}$. The assumption enables measurement of only one of the entities to be sufficient. Validity of the assumption can be investigated for each system, and should hold true if the frequency separation between the forward and reverse links of the system is not excessively high. The assumption simplifies description. However, if the assumption is not made, a similar technique may be used in the forward-link of the Network unit 602, or User unit 702 in FIG. 6.

The Equipment ID and reference frequency unit 624 basically generates a Binary Phase Shift Keying (BPSK) signal, modulated by the equipment ID number and placed at a suitable part of U-NII band, and is coupled in the transmitter path of the forward-link of the Network unit 602 via the directional coupler 630. The unit is "frequency locked" to the local oscillator of the Network unit 602. The carrier frequency of the signal is selected to avoid an unacceptable interference to the main cellular signal in the transmit path of the forward-link of the Network unit 602, but is sufficiently close for an optimum transmission bandwidth. Where the Network unit 602 and the User unit 702 use the mains electricity supply for their operations, the 60 Hz or 50 Hz mains oscillations can be used to "lock" the local oscillators of the two units to a common frequency source. The 60 Hz or 50 Hz mains oscillations are converted, by suitable circuitry, to the desired frequency for the operation of the Network unit 602 and the User unit 702.

Figure 6:
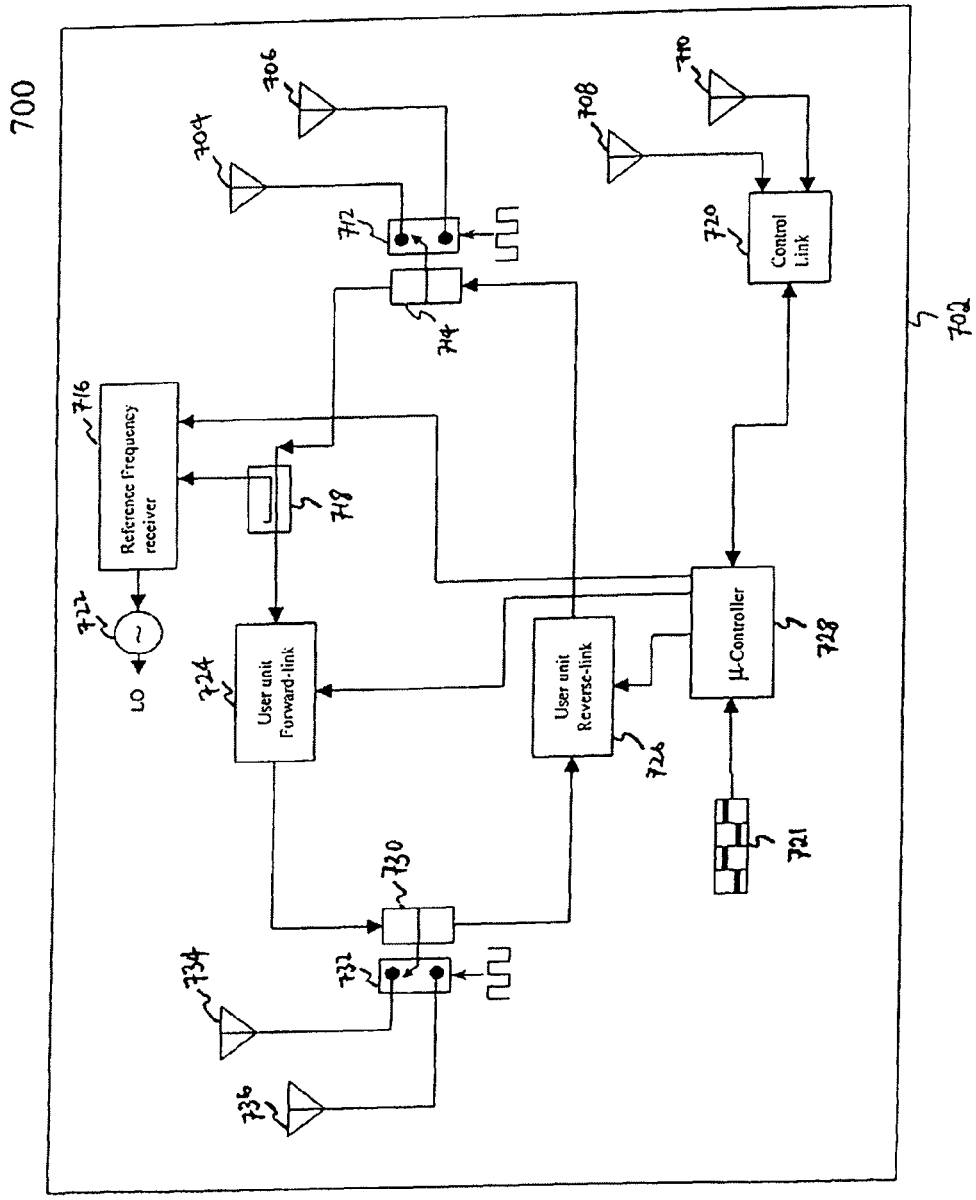
FIG. 6 is a schematic block diagram depicting an embodiment of a repeater that uses two antennas for antenna diversity.

The Control Link unit 628 is a radio link between the two, Network unit 602 and the User unit 702 in FIG. 6. It may be a simple proprietary link that operates in one of the unlicensed band of frequencies, or may be an in-band control signaling, multiplex with the cellular signal path. It may also be a standard wireless link such as 802.11b, 802.11a or Bluetooth, designed to operate in unlicensed frequency band. The control link unit 628 is connected to micro-controller unit 626, and is able to communicate through an appropriate interface. The control link unit 628 is also connected to antenna 644 and 642 for transmission and reception of the control signals. If operating bandwidth and frequencies allow, with minor modifications to unit 602, antenna units 636 and 638 can also be used for the operation of control link unit 628. In some embodiments, the User unit 702 can be a very simple device with all signal processing and control functionalities supported in the Network unit 602. If so, the control link can be eliminated or may implement very simple control signaling such as in-band frequency tones to set the system bandwidth and gain in the User unit 702. Provided that the antenna bandwidth allows, with minor modifications to unit 602, antenna units 636 and 638 can also be used for control link unit 628 operations.

Micro-controller unit 626 is a simple micro-processor such as ARM7 or ARM9 with all the appropriate memory and interfaces. The micro-controller unit 626 is controlling the operation of the Network unit 602, and may perform some additional signal conditioning and processing such as signal level averaging and estimation, where useful. Some of the task of the micro-controller unit 626 is to set the operating bandwidth and gain of the forward and reverse links of the Network units 604 and 606, communicate with and control the User unit 702 in FIG. 6, via the control link unit 628, control and communicate with the calibration signal generator and transmitter 622 and calibration signal receiver 620. Other tasks of the micro-controller 626 are discussed later by way of an example given in FIGS. 7, 8 and 9. Micro-controller unit 626 is connected to units 628, 622, 606, 604, 620 and 624.

Units 628, 622, 606, 604, 620, 624, 602 are all connected to local oscillator unit 640, and derive their clock and reference frequencies from the local oscillator 640 signal.

A simple user interface unit 627, which can be a keypad or simple dipswitch, is connected to micro-controller unit 626.

The Network unit 602 has a unique "identity code", which can be set by the user interface unit 627, which is known to the micro-controller unit 626 and can be communicated to the User unit 702 micro-controller unit 728, or any other User units that may be within the operating range of Network unit 602.

FIG. 6 shows an embodiment of a repeater 700 including the User unit 702 (504 in FIG. 4) with the new design features included. Two antennas 734 and 736 are used for antenna diversity, instead of a single antenna 512 in FIG. 4. Also, two antennas 704 and 706 are used for antenna diversity, instead of a single antenna 510 in FIG. 4. Although any diversity-combining scheme such as Maximal Ratio Combining, etc. can be used for the receiver chain, and transmit diversity schemes such as random phase change in one or both antennas for the transmitter chain, a simple scheme that is based on antenna switched diversity with "continuous switching" strategy is suggested here. The continuous switching strategy, with the switching rate selected for optimum performance (e.g. at, or twice, the GSM Timeslot rate 4.6 msec), can be used for both transmit and receive operation, and will result in a nominal average transmit/receive signal power, provided the antennas are placed sufficiently apart. The continuous-switch diversity scheme can be easily implemented using a simple RF switch at the antenna ports. Therefore the RF switch 732 connected to antennas 734 and 736 and the duplex filter 730 will provide switching operations for the cellular transmit/receive operation of the User unit 702. Also the RF switch 712 connected to antennas 704 and 706 and the duplex filter 714 will provide switching operations for the U-NII band transmit/receive operation of the User unit 702. The duplex filter 712 is connected to Forward-link User unit 724 (518 in FIG. 4), via the directional coupler 718, and the Reverse-link User unit 726 (520 in FIG. 4). Also, the duplex filter 732 is connected to Forward-link User unit 724, and Reverse-link User unit 726. It is also possible to use a hybrid combiner instead of the directional coupler 718. It is also possible, and is more desirable, to place the Forward-link User unit 328 receiver 210 internal LNA, before the directional coupler 718 (or the hybrid combiner replacement), in diagram 700.

The Reference signal receiver unit 716, which is capable of receiving the transmitted signal generated by the equipment ID and reference frequency generator 624 in FIG. 5, is connected to the directional coupler 718. The receiver is capable of extracting the reference frequency and the ID code transmitted by the Network unit 602 equipment ID and reference frequency generator 624. The extracted reference frequency is then used to provide a reference local oscillator 722, as reference frequency signal. The directional coupler 718 is connected to the Forward-link User unit 724. Reverse-link User unit 726 is connected to duplex filters 730 and 714. The reference signal and the local oscillator unit 722 can alternatively be based on the control link unit 720 oscillator, if the unit 726 is capable of locking to the received signal carrier frequency which has been transmitted by control link unit 628 of the Network unit 602.

The Control Link unit 720 is a radio link between the two, Network unit 602 and the User unit 702. It may be a proprietary link that operates in one of the unlicensed band of frequencies, or may be a standard wireless link such as 802.11b, 802.11a or Bluetooth, designed to operate in unlicensed band. The control link unit 720 is connected to micro-controller unit 728, and is able to communicate through an appropriate interface. The control link unit 720 is also connected to antennas 708 and 710 for transmission and reception of the control signals. Note that provided that the antenna bandwidth and operating frequency allow, with minor modifications to unit 702, antenna units 704 and 706 can also be used for the control link unit 720 operations.

Micro-controller unit 728 is a simple microprocessor such as ARM7 or ARM9 with all the appropriate memory and interfaces. The micro-controller unit 728 is controlling the operation of the User unit 702 and may perform some additional signal conditioning and processing such as signal level averaging and estimation. Some of the task of the micro-controller unit 728 is to set the operating bandwidth and gain of the Forward and Reverse link User units 724 and 726, to communicate with the Network unit 602 in FIG. 5 via the control link unit 720. Other tasks of the micro-controller 728 are discussed later by way of an example given in FIGS. 10 and 11. Micro-controller unit 728 is connected to units 720, 726, 724 and 722. The micro-controller unit 720 is not strictly essential since the control unit 626 can perform appropriate tasks in the User unit 702 via the control link units 628 and 720 based on a simple acknowledgement scheme.

Units 720, 726, 724 and 728 are all connected to local oscillator unit 722, and derive their clock and reference frequencies from the local oscillator 722 signal.

Techniques, such as the use of vertical polarization for antennas units 610 and 608, and horizontal polarization for antennas 734 and 736 can further improve the system performance. It is also possible to improve system performance by the use of directional antennas, as in conventional booster and repeater systems.

A simple user interface unit 721, which can be a keypad or simple dipswitch, is connected to micro-controller unit 728.

The User unit 702 has a unique "identity code", which can be set by user interface unit 721, which is known to the micro-controller unit 728 and can be communicated to the Network unit 602 micro-controller unit 626, or any other Network units that may be within the operating range of User unit 702.

The unique Network unit 602 identity code and optionally device location can be transmitted to the cellular network. The information can be used to locate a user in an indoor environment, for example by generating a heavily coded (protected), low bit rate data, containing a long known preamble, the unique identity code and optionally the longitude and the latitude of the Network unit 602. The information can then be pulse-shaped for low spectral leakage and superimposed on the reverse-link signal of a given channel by an appropriate modulation scheme, within the Network unit 602. The choice of the modulation scheme depends on the operating cellular system. For example, for GSM, which enjoys a constant envelope modulation such as GMSK, amplitude modulation (with low modulation index) can be used. For CDMA systems, with fast reverse-link power control, DBPSK can be used as the modulation scheme. The extraction of the above mentioned information from the received channel signal at base station may involve base station receiver modifications, but does not effect the normal operation of the cellular link.

Figure 7:
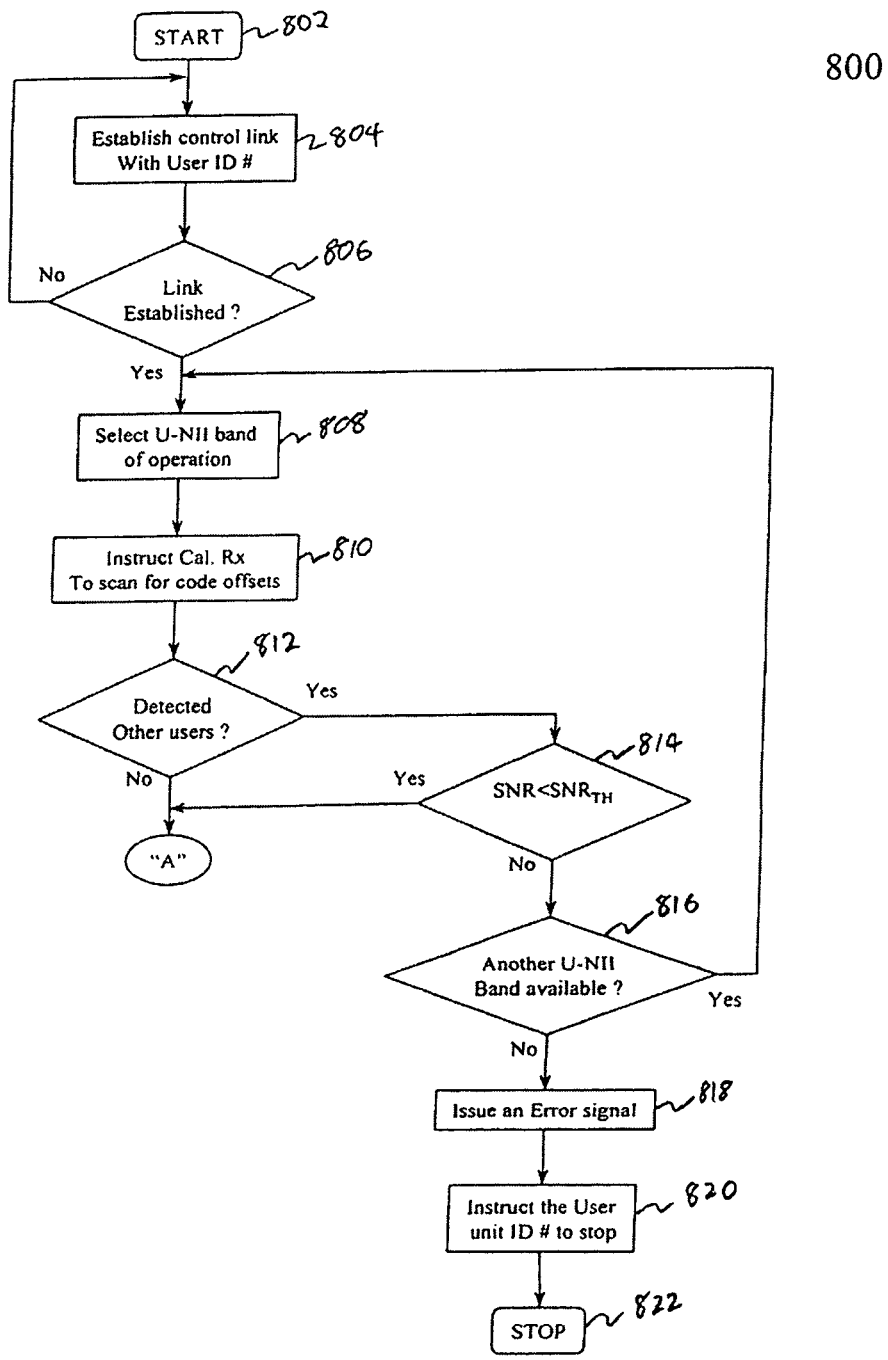
FIGS. 7-11 are flow charts depicting embodiments of system operation flow for a network unit (7-9) and a user unit (10-11)
Figure 8:
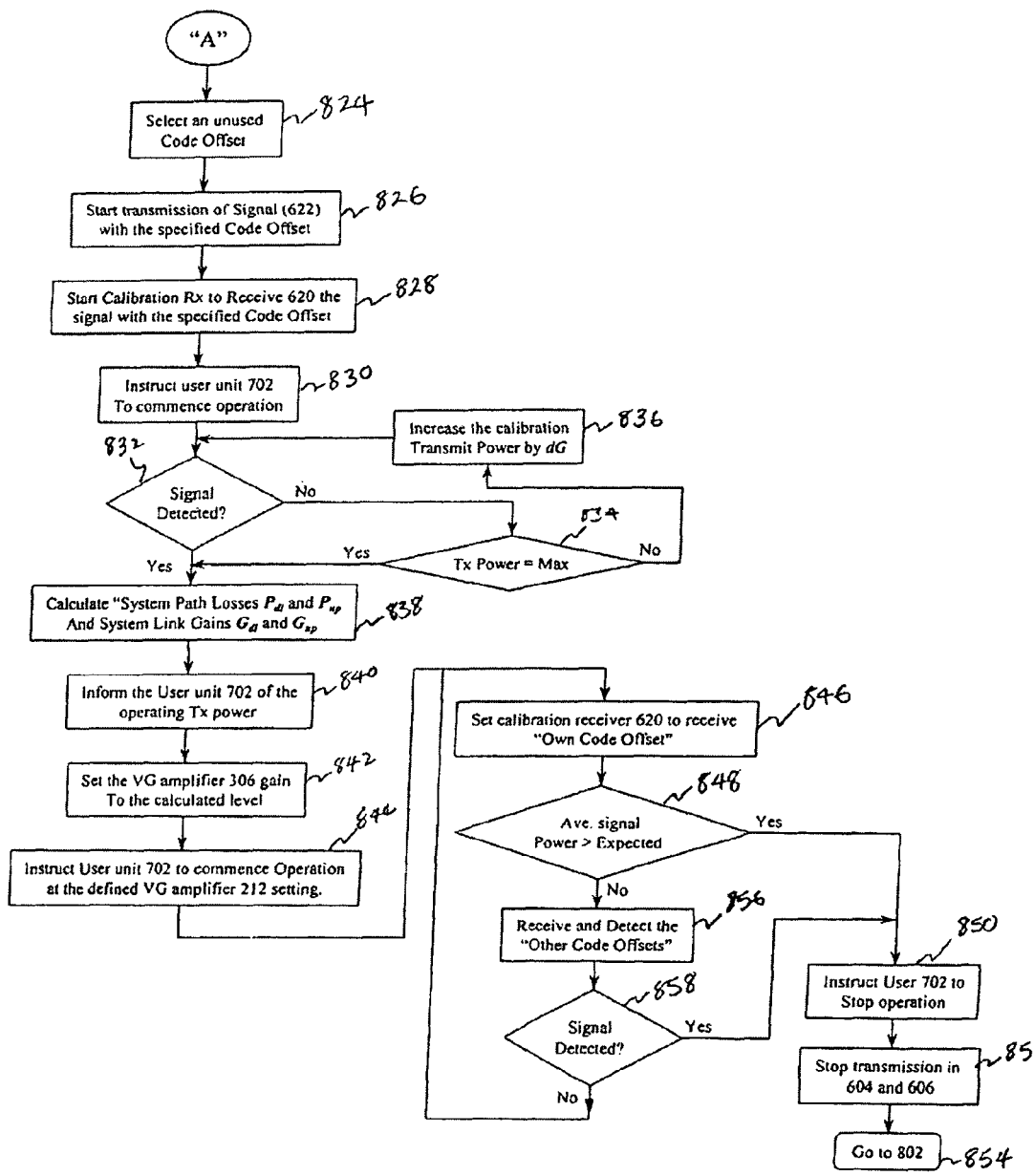
Figure 9:
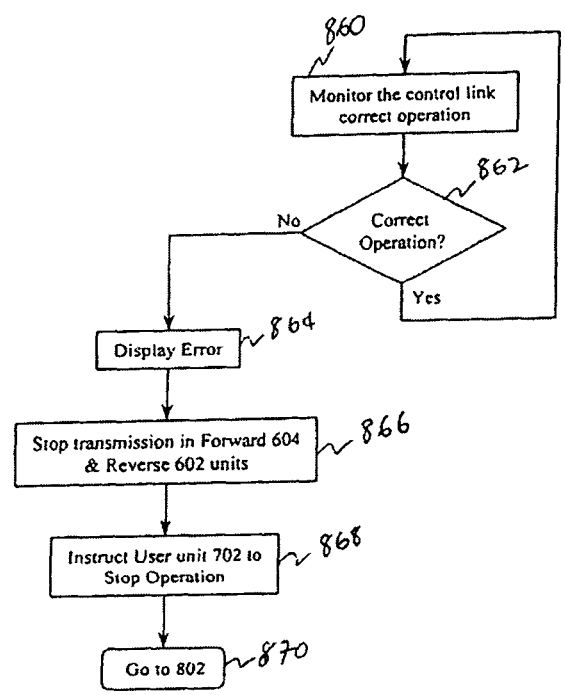
Figure 10:
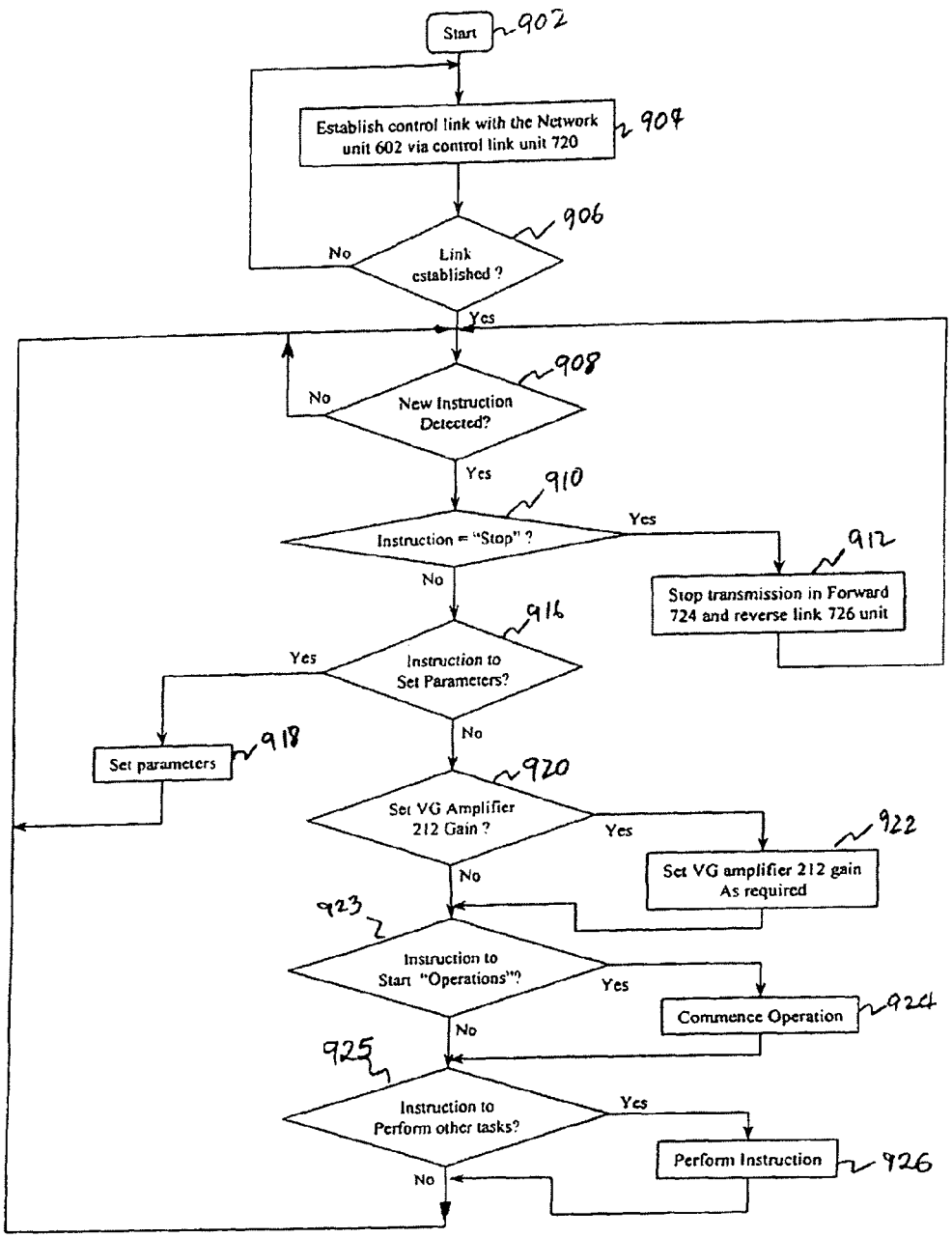
Figure 11:
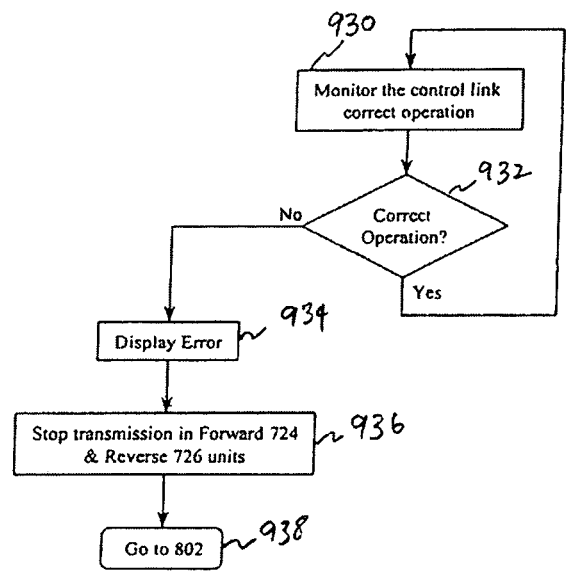

An example of the above system operation is shown in FIGS. 7, 8, 9, 10 and 11. FIGS. 7, 8 and 9 are the system operation flow diagrams for the Network unit 602 and FIGS. 10 and 11 are the flow diagrams for the User unit 702. There are mainly two independent control flow operations that are executed concurrently on the micro-controller 626. The first control-flow is to establish normal operation of the booster, with the second one to monitor the correct operation of the control link between the Network unit 602 and the User unit 702. On "power-up" or "reset" of the Network unit 602, the VG amplifier 306 gain is always set to minimum and is switched "OFF". The system is said to be "operational" when VG amplifier 306 is switched "ON", after the correct gain setting by instruction from micro-controller 626. On "power-up" or "reset" of the Network unit 602 (assuming that the "identity code" of the interested User unit 702 is known by or pre-entered into the Network unit 602 via the user interface unit 627), the micro-controller unit 626 will start the control-flow (step 802) in FIG. 7. The micro-controller unit 626 instructs the control link unit 628 to establish link with the User Unit 702 (step 804). The control link unit 628, using the appropriate protocols, will continue trying to establish a communication link with the control unit 720 of the User unit 702 until such link is established (step 806). The micro-controller unit 626 will select the desired U-NII band of operation (step 808) and instruct the calibration signal receiver unit 620 to attempt to receive all the possible code offsets (step 8) in the frequency band, ensuring no signal paths from other User units are operational in the geographical area directed to the Network unit 602, and facilitating selection of an unused code offset and transmission channel. If an unintended signal path exists between the Network unit 602 and other operating User units (step 812), depending on the severity of the coupling path and the strength of the "other units" received calibration signal(s) strength, several different actions can be taken, after a comparison of the received signal SNR with threshold SNR ($SNR_{th}$) (step 814);

1) If the strength of the received calibration signal(s) from other User units is below the threshold ($SNR_{th}$), indicating NO interference with the operation of the Network unit 602 and User unit 702, an appropriate different code phase is selected, and the micro-controller proceeds as normal.
2) If the strength of the received calibration signal(s) from other User units is above the threshold ($SNR_{th}$), indicating interference with the operation of the Network unit 602 and User unit 702, the Network unit 602 will try to select another U-NII frequency band of operation (step 816), and if more U-NII operating band available, steps 808, 8, and 812 are repeated (step 816).
3) If the strength of the received calibration signal(s) from other User units is above the threshold ($SNR_{th}$), indicating interference with the operation of the Network unit 602 and User unit 702, and no new clean U-NII operating frequency band can be found, the Network unit 602 will issue an appropriate error signal (block 818) and instruct User unit 720 to stop operation (step 9), and the Network unit 602 stops operation (step 822).

After the successful establishment of the control link between the Network unit 602 and the User unit 702, and successful selection of an U-NII operation band, the control flow would be at point "A" in FIG. 7. Point "A", shown in FIG. 8, is the continuation of point "A" in FIG. 7. With reference to FIG. 8, after the point "A", the Network unit 602 will select an unused code offset (824), and start the transmission of the calibration signal with the known code offset, at the lowest possible transmit power (step 826). The task is performed by an instruction from the micro-controller 626 to the calibration signal generator and transmitter unit 622. The micro-controller 626 will also instruct the calibration signal receiver unit 620 to try to receive the calibration signal for the above mentioned code offset, used by the transmitter unit 622 (block 828). The Network unit 602 instructs the User unit 702, via the control link 628, to commence operation, with the minimum possible transmitter powers for Reverse-link and Forward-link User units 726 and 724 respectively (step 830). If no signal is detected with a desired strength by receiver 620 (step 832), and the maximum transmit power of the transmitter unit 622 has not been reached (step 834), the micro-controller unit 626 will instruct the transmitter unit 622 to increase the power of the transmitted signal by a predetermined step size, dG, (step 836). The operation continues until a signal is detected at the output of the receiver 620, or until establishment that no signal can be detected with even the maximum transmit power of the transmitter unit 622. Then, the Network unit 602 is capable of calculating the Up-link System Path Loss, $PL_{u1}$, and hence the Up-link System Link Gain, $G_{u1}$, and accordingly, supplies appropriate transmitter power of the Reverse-link Network unit 606 (step 838). Assuming the Up-link System Path Loss, $PL_{u1}$, and the Down-link System Path Loss, $PL_{d1}$, are the same, i.e. $PL_{d1}=PL_{u1}$, the maximum gain of the transmitter amplifier 212 of the Forward-link User unit 724 can be calculated (step 838) and forwarded to User unit 702, via the control link unit 628 (step 840). After the establishment of the system gain, the micro-controller 626, via link control unit 628, informs the User unit 702 of the correct amplifier 212 gain setting (block 840). After the completion of the system calibration (steps 804 to 840), the micro-controller 626 sets the amplifier 306 at the correct gain for transmission (step 842) and instructs the User unit 702 to commence operation with the stated amplifier 212 gain setting (block 844). The calibration signal receiver 620 continues to receive the signal transmitted by the calibration signal transmitter 622 (step 846). If the safe average signal power level is exceeded for a substantial amount of time (step 848), the micro-controller 626 will instruct the User unit 702, via the control link unit 628, to stop operation (step 850), and also Network 602 will stop transmission of signals by the Reverse-link Network unit 606 (step 852), and the system steps 802 to 844 are repeated. If the average signal power level is within the expected range, the calibration signal receiver 620 is instructed to receive and detect signals with all other possible code offsets (step 856). If no signal with substantial average signal power level is detected, the Network unit 602 will return to step 846. If a signal with substantial average signal power level is detected, the Network unit 602 will go to step 850. In order to speed up the search and detection of other code offsets, it is also possible to have two (or more) replicas of the calibration signal receiver 620, such that the "own code" detection can be continuous and uninterrupted, while other receiver replicas can scan for "other code" offsets.

The second control-flow operation starts after step 806, and is shown in FIG. 9. The second operation checks the quality and performance of the control links of the control units 628 and 720 operation, by monitoring such quantities as BER, SNR, background noise and interference (step 860). If the operation of the link is not satisfactory (step 862), an error signal is flagged (step 864), all transmissions in the forward and reverse cellular link, of the Network unit 602 are stopped (step 866), and the User unit 702 is instructed to stop operation (step 868), and finally the Network unit 602 will go back to step 802 (step 870).

FIGS. 10 and 11 are the system operation flow diagram for the User unit 702. There are mainly two independent control flow operations that are executed concurrently on the micro-controller 728. The first control-flow is to establish normal operation of the booster (FIG. 10), with the second one to monitor the correct operation of the control link between the Network unit 602 and the User unit 702 (FIG. 11). On "power-up" or "reset" of the User unit 702, the VG amplifier 212 gain is always set to minimum and is switched "OFF". The system is said to be "operational" when VG amplifier 212 is switched "ON", after the correct gain setting by instruction from micro-controller 728. On "power-up" or "reset" of the User unit 702 (assuming that the "identity code" of the interested Network unit 602 is known by or pre-entered into the User unit 702 via the user interface unit 721), the micro-controller 728 will start the control-flow (step 902 in FIG. 10).

The micro-controller unit 728 instructs the control link unit 720 to establish link with the Network Unit 602 (step 904). The control link unit 728, using the appropriate protocols, will continue trying to establish a communication link with the control unit 620 of the Network unit 602 until such link is established (step 906). After the successful establishment of the control link between the User unit 702 and the Network unit 602, the User unit 702 monitors the control channel for instruction from the Network unit 602 (step 908). If a "stop" instruction is issued by the Network unit 602 (step 11), the User unit 702 will stop the forward-link and reverse-link transmissions (step 912). If the instruction is to set parameters (step 916) such as the "operation bandwidth", or the "U-NII spectrum channel number", or "the cellular channel number", or any or all of the above, and any other system parameters to be set, the User unit 702 sets the parameters as specified by the instruction (step 918). If the instruction is to "set the amplifier 212 gain" (step 920), the User unit 702 sets the requested gain for the VG amplifier 212 (step 922). If the instruction is to "commence transmission" (step 923), the User unit 702 begins operation in the forward 724 and the reverse 726 links of the unit (step 924). Other instructions that are not mentioned in the example may be used. The instructions are executed by the User unit 702 if the instructions are received by the User unit 702 (step 925 & 926). After instruction execution, the User unit 702 returns to step 908.

The second control-flow operation starts after step 906, and is shown in FIG. 11. The second operation checks the quality and performance of the control links of the control units 628 and 720 operation, by monitoring such quantities as BER, SNR and the background noise and interference (step 930). If the operation of the link is not satisfactory (step 932), an error signal is flagged (step 934), all transmissions in the forward 724 and reverse 726 link units, are stopped by the User unit 702 (step 936), and finally the User unit 702 will go back to step 902 (step 938).

The description is merely an example a system implementation. Other possible methods and solutions may be implemented. Several points may be noted.

Figure 14:
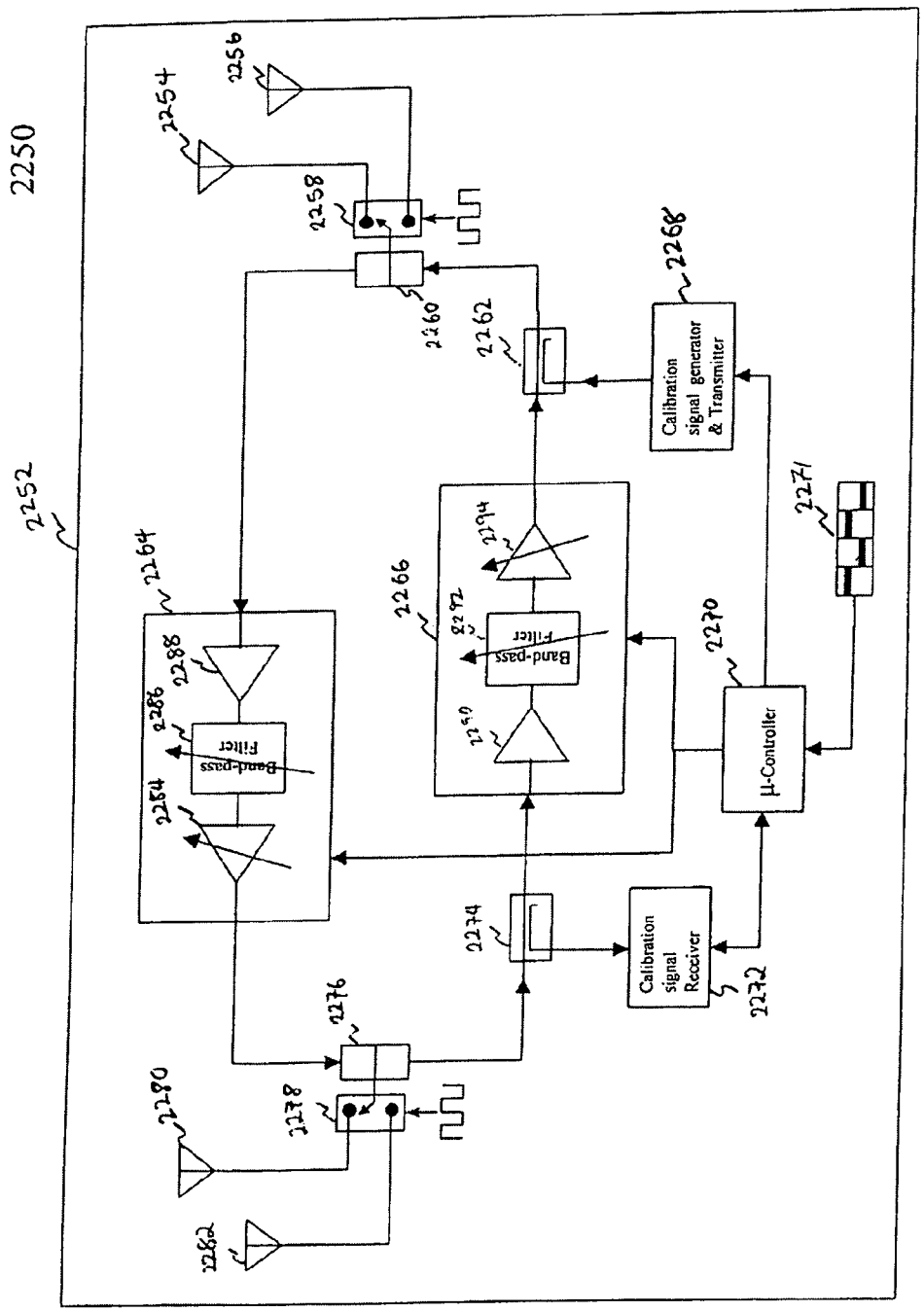
FIG. 14 is a schematic block diagram showing an embodiment of an analog implementation of a back-to-back repeater.

1. The Network unit 602 can control several User units, such as the User unit 702. In such setups, the example control flow, shown in FIGS. 7, 8, 9, 10 and 11 may be modified such that the Network Unit 602 can initialize each User unit independently. For stable operation, the Reverse-link Network unit 606 amplifier 306 gain is set for the minimum Up-link System Path Loss, $PL_{u1}$, for operation with all the active User units. Thus, if the Down-link System Path Loss, $PL_{d1}$, is based on the Up-link System Path Loss, $PL_{u1}$, calculations (i.e. $PL_{d1} \approx PL_{u1}$), the minimum amplifier 306 gain is used for all the User units in the forward-link under the control of the Network unit 602. If the Down-link System Path Loss, $PL_{d1}$, is NOT based on the Up-link System Path Loss (i.e. a separate calibration loop exists for estimating $PL_{d1}$), the amplifier 306 gain can be set independently for each User units in the forward-link, under the control of the Network unit 602.
2. Another modification used for a multiple-User unit (several User units 702) operation is that the final Down-link System Path Loss, $PL_{d1}$, and the Up-link System Path Loss, $PL_{u1}$, measurements can be performed with all User units under the control of the Network unit 602 (including Network unit 602), active such that aggregate signal power levels do not exceed the desired Down-link System Link Gain, $G_{d1}$, or the desired Up-link System Link gain, $G_{u1}$. If combined signal from the User Units exceeds the acceptable level for either of the reverse or forward system link gains, the appropriate amplifier gains are reduced in iterative step increments to such level that the maximum allowed system link gain, or the forward and the reverse links are met.
3. Additional hardware, similar to the calibration signal generator and transmitter 622, and the calibration signal receiver 620, may be included in the forward-link path of either the Network unit 602 or the User unit 702, to assess the Down-link System Path Loss, $PL_{d1}$, independently (for each User unit 702 controlled by Network unit 602).
4. Although the signal path in both the Network unit 620 and the User unit 702, in the forward link, is constantly active, to boost the beacon (BCCH in GSM) transmissions of the base stations, the reverse-link path signal path of the Network unit 620 and the User unit 702 may be active, unless a substantial signal level is detected (i.e. "gated"). Therefore, in the User unit 702, based on the received signal power level on reverse-link, which can be measured after the LNA unit 320 or filter unit 321, the micro-controller unit 728 switches the transmitter unit 316 "OFF" if the signal power level is below the desired threshold, or "ON" if the signal power level is above the desired threshold. Equally, in the Network unit 602, based on the received signal power level on reverse-link, which can be measured after the receiver unit 310 or converter unit 308, the micro-controller unit 626 switches the variable gain amplifier unit 306 "OFF" if the signal power level is below the desired threshold, or "ON" if the signal power level is above the desired threshold. Care is taken that the reverse-link "gated" operation does not interfere with the calibration signal path and mechanism involving the units 622 and 620. Therefore, either the "gated" operation is replaced by continuous operation during the calibration process, or where possible, a forward-link calibration is placed and used in a manner similar to the reverse-link mechanism for both Down-link System Path Loss, $PL_{d1}$ and Up-link System Path Loss, $PL_{u1}$ calculations.
5. With certain modifications in the hardware and the control software, the Network unit 602 and the User unit 702 can be merged into a single unit, connected "back-to-back". The design and operation of the back-to-back option is shown in FIG. 14 and discussed later.
6. The unique Network unit 602 identity code and optionally device location can be transmitted to the cellular network. The information can be used to locate a user in an indoor environment, for example by generating a heavily coded (protected), low bit rate data, containing a long known preamble, the unique identity code and optionally the longitude and the latitude of the Network unit 602. The information can then be pulse-shaped for low spectral leakage and superimposed on the reverse-link signal of a given channel by an appropriate modulation scheme, within the Network unit 602. The choice of the modulation scheme depends on the operating cellular system. For example, for GSM, which enjoys a constant envelope modulation such as GMSK, amplitude modulation (with low modulation index) can be used. For CDMA systems, with fast reverse-link power control, DBPSK can be used as the modulation scheme. The extraction of the above mentioned information from the received channel signal at base station may involve base station receiver modifications, but does not effect the normal operation of the cellular link.

The above discussion is applicable to all the different analogue implementations of all the various disclosed boosters.

Digital Implementation Example

Figure 12:
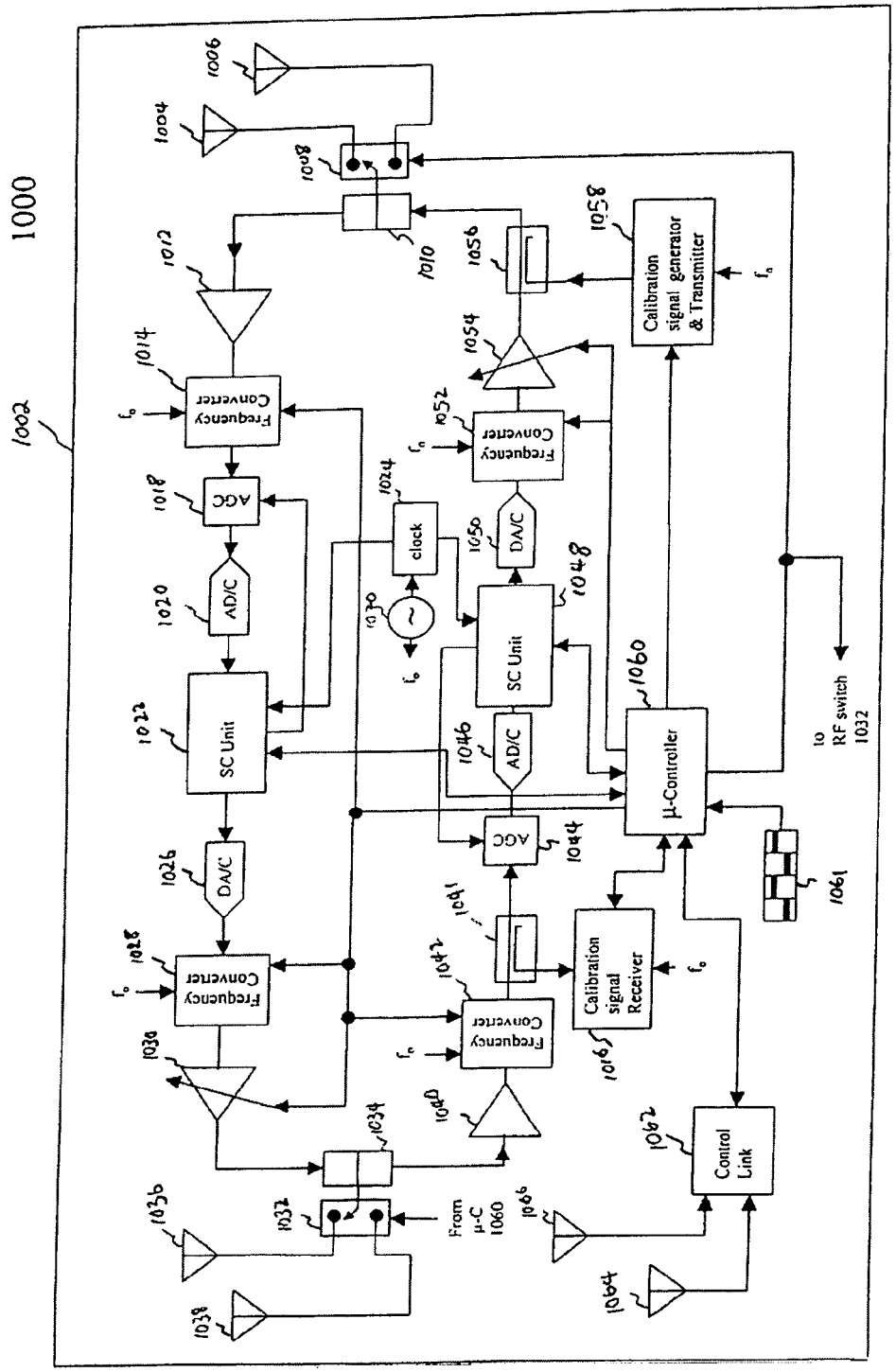
FIGS. 12 and 13 are schematic block diagrams showing embodiments of digital repeater implementations.

FIG. 12 shows an example of digital implementation of the Network unit 602 (labeled 1002 in FIG. 12), which is placed where good signal coverage exists, indoor or outdoors. Two antennas 1004 and 1006 are used for antenna diversity for the cellular band transmitter and receiver of the Network unit 1002. Also two antennas 1036 and 1038 are used for antenna diversity of the U-NII band operation of the Network unit 1002. Although, any diversity-combining scheme such as Maximal Ratio Combining, etc. can be used for the receiver chain, and transmit diversity schemes such as random phase change in one or both antennas for the transmitter chain, a simple scheme that is based on antenna switched diversity with "continuous switching" strategy is suggested here. The continuous switching strategy, with the switching rate selected for optimum performance (e.g. at, or twice the GSM Timeslot rate ~4.6 msec), can be used for both transmit and receive operations, and will result in a nominal average transmit/receive signal power, provided the antennas are placed sufficiently apart. The continuous-switch diversity scheme can be simply implemented using only a simple RF switch at the antenna ports. Therefore, the RF switch 1008 connected to antennas 1004 and 1006 and the duplex filter 1010, and the micro-controller 1060, under the control of the micro-controller 1060, will provide switching operations for the cellular transmit/receive operation of the Network unit 1002. Also, the RF switch 1032 connected to antennas 1036 and 1038 and the duplex filter 1034 will provide switching operations for the U-NII band transmit/receive operation of the Network unit 1002. The duplex filter 1010 is connected to forward-link LNA 1012 and the directional coupler 1056. LNA 1012 is connected to the frequency converter unit 1014. Frequency converter 1014 is connected to Automatic Gain Control (AGC) unit 1018. The frequency converter 1014 converts the frequency band of the incoming signal from the cellular band to baseband, or "near baseband" frequency band. The frequency converter unit 1014 may supply appropriate filtering for the correct operation of the receiver chain. The operating frequency of the frequency converter unit 1014 is set by micro-controller unit 1060. The AGC unit 1018 is connected to Analogue to Digital Converter (AD/C) unit 1020 and the Signal Conditioning (SC) unit 1022. The AGC 1018 is optional, and its task is to place the received signal level substantially close to the middle of the dynamic range of the AD/C 1020. If included, the design and operation of the unit 1018 is configured so that in the presence of low signal power noise within the operating bandwidth does not dominate the operation of the AGC unit 1018. Also care is taken so that the gain contribution of the AGC unit 1018 is compensated in the final Down-link System Link Gain $G_{d1}$ calculations or the gain value of the AGC 1018 is compensated in the SC unit 1022. If the AGC unit 1018 is not included, the AD/C unit 1020 has to provide the appropriate dynamic range, which can be as high as 144 dB (24-bits). The AD/C unit 1020 is connected to the Signal Conditioning unit 1022. The Signal Conditioning unit 1022 performs such tasks as channel select filtering for the desired operating frequency band, frequency conversion, insertion of reference frequency, signal level estimation, AGC algorithm, WLAN transmitter algorithms, and any other features that use signal conditioning and processing. For example, the channel select filters that can be implemented as poly-phased filters can be set for a given operating bandwidth of 1.3, 5, 10 or 15 MHz, operating at any position within the forward-link cellular or PCS or desired frequency spectrum. The Signal Conditioning unit 1022 clock frequency is derived from a local reference frequency 1070 and provided by clock unit 1024. Depending on the system parameters and the appropriate operational bandwidth and the load of the supported operations, such as filtering, the Signal Conditioning unit 1022 may be implemented by a variety of technologies such as FPGAs, ASICs and general purpose DSPs such as Texas Instruments TMS320C6416-7E3 processor. The Signal Conditioning unit 1022 may include all appropriate interfaces and memory. The Signal Conditioning unit 1022 is connected to Digital to Analogue Converter (DA/C) unit 1026. The DA/C unit 1026 may include appropriate post filtering after digital to analogue conversion. The DA/C unit 1026 is connected to frequency converter unit 1028. Frequency converter unit 1028 up-converts the frequencies of the input signal to the desired portion of U-NII band of frequencies. The frequency converter unit 1028 may supply all filtering for the correct operation of the transmitter chain. The operating frequency of the frequency converter unit 1028 is set by micro-controller unit 1060. Therefore, Dynamic Channel Allocation (DCA) algorithm can be used to select the best operating frequency band. The frequency converter unit 1028 is connected to the variable gain amplifier unit 1030. The gain of the amplifier 1030 is set by the micro-controller unit 1060, and in most time is set to maximum allowed power for transmission in U-NII band. The variable gain amplifier unit 1030 is connected to Duplex filter 1034.

The duplex filter 1034 is connected reverse-link LNA 1040 an the VG amplifier 1030. LNA 1040 is connected to the frequency converter unit 1042. Frequency converter unit 1042 is connected to the directional coupler unit 1041. The frequency converter 1042 converts the frequency band of the incoming signal from the U-NII band to baseband, or "near baseband" frequency band. The frequency converter unit 1042 includes filtering for the correct operation of the receiver chain. The operating frequency of the frequency converter unit 1042 is set by micro-controller unit 1060. Directional coupler unit 1041 is connected to Automatic Gain Control (AGC) unit 1044, and the calibration signal receiver unit 1016. The AGC unit 1044 is connected to Analogue to Digital Converter (AD/C) unit 1046 and the Signal Conditioning unit 1048. The AGC 1044 is optional, and its task is to place the received signal level substantially close to the middle of the dynamic range of the AD/C 1046. If included, the design and operation of the unit 1044 are configured so that in the presence of low signal power noise within the operating bandwidth does not dominate the operation of the AGC unit 1044. Also care can be taken so that the gain contribution of the AGC unit 1044 is compensated in the final Up-link System Link Gain $G_{u1}$ calculations or the gain value of the AGC 1044 is compensated in the SC unit 1048. If the AGC unit 1044 is not included, the AD/C unit 1046 supplies suitable dynamic range, which can be as high as 144 dB (24-bits). The AD/C unit 1046 is connected to the Signal Conditioning unit 1048. The Signal Conditioning unit 1048 performs such tasks as channel select filtering for the desired operating frequency band, frequency conversion, signal calibration receiver, signal level estimation, AGC algorithm, WLAN receiver algorithms and any other features that use signal conditioning and processing. For example, the channel select filters that can be implemented as poly-phased filters can be set for a given operating bandwidth of 1.3, 5, 10 or 15 MHz, operating at any position within the forward-link U-NII or any desired frequency spectrum. The Signal Conditioning unit 1048 clock frequency is derived from a local reference frequency 1070 and provided by clock unit 1024. Depending on the system parameters such as appropriate operational bandwidth and the load of the supported operations, such as filtering, the Signal Conditioning unit 1048 may be implemented by a variety of technologies such as FPGAs, ASICs and general purpose DSPs such as Texas Instruments TMS320C6416-7E3 processor. The Signal Conditioning unit 1048 may include all appropriate interfaces and memory. The Signal Conditioning unit 1048 is connected to Digital to Analogue Converter (DA/C) unit 1050. The DA/C unit 1050 is connected to frequency converter unit 1052. The DA/C unit 1050 supplies post filtering subsequent to digital to analogue conversion. Frequency converter unit 1052 up-converts the frequencies of the input signal to the desired portion of cellular or PCS band of frequencies. The frequency converter unit 1052 includes filtering for the correct operation of the transmitter chain. The operating frequency of the frequency converter unit 1052 is set by micro-controller unit 1060. The frequency converter unit 1052 is connected to the variable gain amplifier unit 1054. The gain of the amplifier 1054 is set by the micro-controller unit 1060. The variable gain amplifier unit 1054 is connected to directional coupler 1056. The directional coupler 1056 is connected to Duplex filter 1010. It is also possible to use hybrid combiners instead of the directional couplers 1041 and 1056.

A calibration signal generator/transmitter 1058 is coupled to the reverse-link transmitter path via the directional coupler 1056. The unit 1058 will provide a calibration signal, at desired power levels, which is used to establish the level of the above mentioned Up-link System Path Loss, $PL_{u1}$, that exists between the Network unit 1002 (502 in FIG. 4) and the User unit 2002 in FIG. 13 (504 in FIG. 4). The calibration signal generated by unit 1058 is transmitted via the diversity antennas 1004 and 1006 at a set transmit level which is substantially below any expected signal level from cellular network (e.g. 20 dB below the minimum expected cellular signal level). The calibration signal generated by unit 1058 is a direct-sequence spread spectrum signal modulated by a known Pseudo Random (PN) code with a known code phase ("own code" phase) and with a chipping rate comparable to the forward and reverse links of the Network unit 1002 and User unit 2002 operating bandwidths. The code phases are selected such that the minimum code phase difference is larger than the maximum expected path delay (measured in multiple number of chips) and after that, the other code phases should be multiple integer of the minimum code phase. The calibration signal receiver 1016 which is connected to the reverse-link of the Network unit 1002, by using the known PN code and the transmit code phase ("own code" phase), is then capable of detecting and demodulating the calibration signal transmitted by unit 1058, which has entered the reverse-link path via the mentioned closed-loop mechanism that exists between the Network unit 1002 and the User unit 2002 in FIG. 13 (504 in FIG. 4). The calibration signal receiver unit 1016 is capable of establishing the received signal strength, which is then used to estimate the Up-link System Path Loss, $PL_{u1}$, that exists between the Network unit 1002 (502 in FIG. 4) and the User unit 2002 in FIG. 13 (504 in FIG. 4). The PN code phase can be assigned uniquely, or drawn according to a random algorithm, such that the probability of two units having the same code phase can be very low. The feature enables the calibration signal receiver 1016 to be able to scan and receive "other code" phases, and hence, establishing if there is any other signal coupling to or from other units that may be operating in the same geographical area. The code can also be modulated with information about the identity of the Network unit 1002. The carrier frequency of the transmitted calibration signal may be at the operating cellular frequency band. However, carrier frequencies in other bands, such as ISM band at 2.4 GHz, may be used for the transmission of the calibration signal so that the calibration signal generator and transmitter 1058 carrier frequency is placed as near as possible to the operating frequency band. The chipping rate and the transmit power of the calibration signal PN code are such that the calibration signal complies with the FCC 47 CFR Part-15 rules. Although the ISM band is not the same as the cellular operating band, nevertheless, the band is sufficiently close to enable the system to establish the antenna coupling and the Up-link and Down-link System Link Gains, ($G_{u1}$, $G_{d1}$), at the cellular operating band. The instantaneous amplitude and phase values are no longer relevant operating at ISM band. Any antenna and propagation differences in the average signals level between the two ISM and cellular operating bands can be investigated in the design phase and taken into account in the final system design.

The calibration transmitter unit 1058 and the calibration receiver unit 1026 baseband functions can be integrated and supported by the Signal Conditioning unit 1048. The calibration transmitter unit 1058 and the calibration receiver unit 1016 functions can also be integrated into reverse-link signal path. In the example, the calibration signal generator and transmitter unit 1058 and the calibration signal receiver 1016 are both in the Network unit 1002. However, both or one of the units including calibration signal generator and transmitter unit 1058, and calibration signal receiver 1016, can also be placed in the User unit 2002 with certain modifications and considerations. In some cases, a calibration mechanism for the forward-link, similar to the one described for the reverse-link, includes components such as the units, 1056, 1058, 1016 and 1041, which is placed in the User unit 2002.

The Equipment ID and reference frequency unit 624 shown in FIG. 5, in the forward-link path, is now supported by the Signal Conditioning unit 1022 in the digital Network unit 1002, with the description and function remaining the same as the one discussed for unit 624.

The control link unit 1062 is a radio link between the two Network 1002 and the User 2002 (in FIG. 13) units. It may be a proprietary link that operates in one of the unlicensed band of frequencies, or may be a standard wireless link such as 802.11b, 802.11a, 802.11g or Bluetooth, designed to operate in the unlicensed band. The control link unit 1062 is connected to micro-controller unit 1060 and is able to communicate through an appropriate interface. The control link unit 1062 is also connected to antennas 1066 and 1064 for transmission and reception of the control signals. Note that provided that the antenna bandwidth and operating frequency allow, with minor modifications to unit 1002, antenna units 1036 and 1038 can also be used for the control link unit 1062 operations. With minor modifications to unit 1002, and where the selected operating frequencies allow, the baseband functionality of the control link unit 1062 can be included in the Signal Conditioning units 1022 and 1048, with the transmit/receive control link unit 1062 signals multiplexed (in frequency or time) with the transmit/receive signals of the forward and the reverse-link Network unit 1002, that are transmitted and received by antennas 1038 and 1036.

Micro-controller unit 1060 is a simple micro-processor such as ARM7 or ARM9 with all the appropriate memory and interfaces. The micro-controller unit 1060 is controlling the operation of the Network unit 1002 and may perform some additional signal conditioning and processing such as signal level averaging and estimation. Some of the task of the micro-controller unit 1060 is to set the operating bandwidth and gain of the forward and reverse link Network unit 1002 components, communicate with the User unit 2002 in FIG. 13 via the control link unit 1062, control and communicate with the calibration signal generator and transmitter 1058 and calibration signal receiver 1016. Other tasks of the micro-controller 1060 are discussed by way of an example given in FIGS. 7, 8 and 9. Micro-controller unit 1060 is connected to units 1062, 1016, 1058, 1052, 1048, 1042, 1030, 1028, 1022 and 1014.

Units 1062, 1016, 1058, 1052, 1042, 1060, 1028, 1046, 1020, 1024 and 1014 are all connected to local oscillator unit 1070, or derive their clock and reference frequencies from the local oscillator 1070 signal.

A simple user interface unit 1061, which can be a keypad or simple dipswitch, is connected to micro-controller unit 1060.

Figure 13:
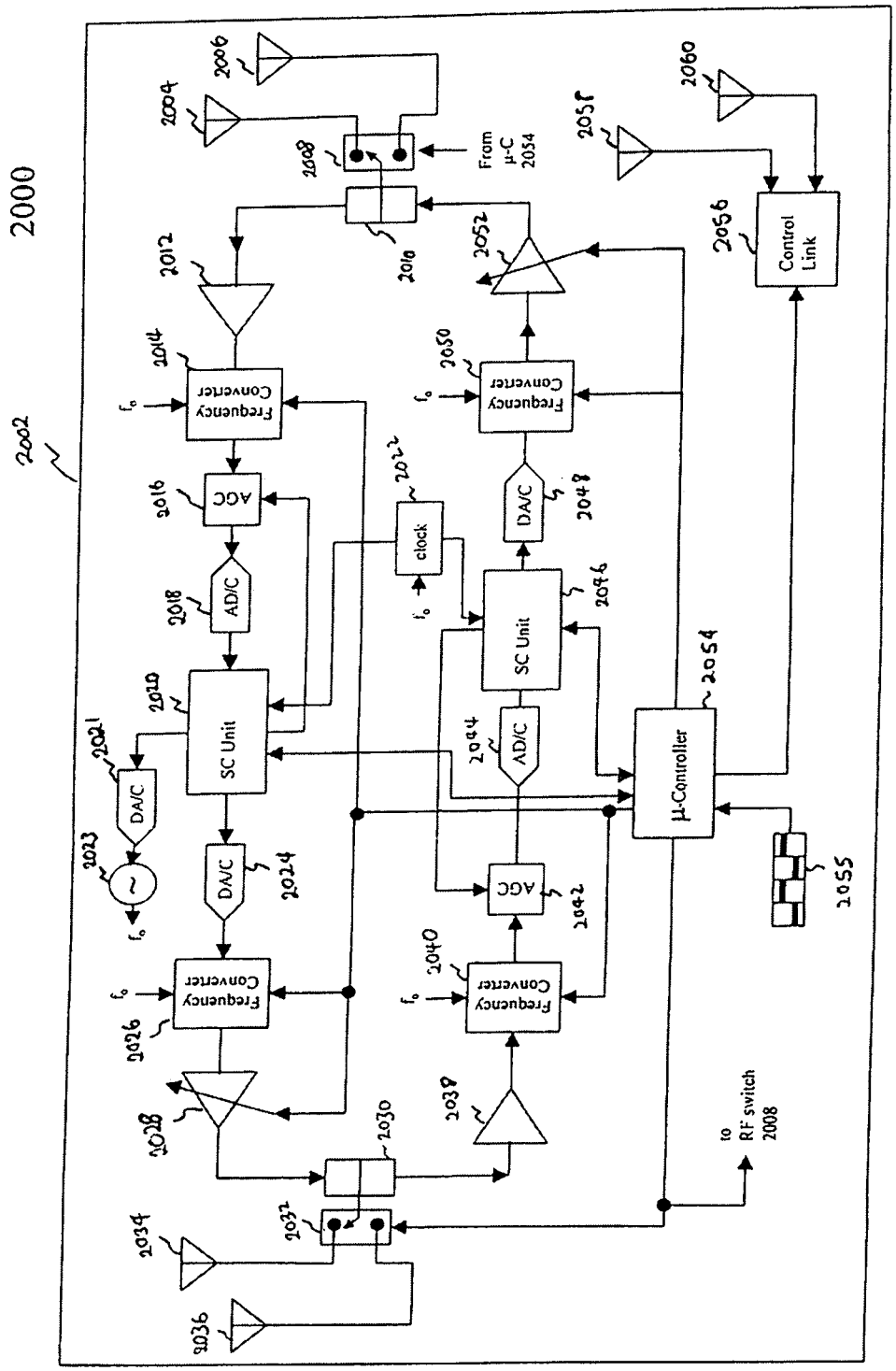

FIG. 13 shows an example of digital implementation of the User unit 702 (labeled 2002 in FIG. 13), which is placed where good signal coverage does not exist, indoor or outdoors. Two antennas 2034 and 2036 are used for antenna diversity for the cellular band transmitter and receiver operation of the User unit 2002. Also, two antennas 2004 and 2006 are used for antenna diversity of the U-NII band operation of the User unit 2002. Although any diversity-combining scheme such as Maximal Ratio Combining, etc. can be used for the receiver chain, and transmit diversity schemes such as random phase change in one or both antennas for the transmitter chain, a simple scheme that is based on antenna switched diversity with "continuous switching" strategy is suggested here. The continuous switching strategy, with the switching rate selected for optimum performance (e.g. at, or twice the GSM Timeslot rate ~4.6 msec), can be used for both transmit and receive operation, and will result in a nominal average transmit/receive signal power, provided the antennas are placed sufficiently apart. The continuous-switch diversity scheme is simply implemented as a simple RF switch at the antenna ports. Therefore, the RF switch 2032 connected to antennas 2034 and 2036 and the duplex filter 2030 and the micro-controller 2054, under the control of the micro-controller 2054, will provide switching operations for the cellular transmit/receive operation of the User unit 2002. Also the RF switch 2008 connected to antennas 2004 and 2006 and the duplex filter 2010 will provide switching operations for the U-NII band transmit/receive operation of the User unit 2002. The duplex filter 2010 is connected to forward-link LNA 2012 and VG amplifier 2052. LNA 2012 is connected to the frequency converter unit 2014. Frequency converter 2014 is connected to Automatic Gain Control (AGC) unit 2016. The frequency converter 2014 converts the frequency band of the incoming signal from the cellular band to baseband, or "near baseband" frequency band. The frequency converter unit 2014 includes all appropriate filtering for the correct operation of the receiver chain. The operating frequency of the frequency converter unit 2014 is set by micro-controller unit 2054. The AGC unit 2016 is connected to Analogue to Digital Converter (AD/C) unit 2018 and the Signal Conditioning unit 2020. The AGC 2016 is optional, and its task is to place the received signal level substantially close to the middle of the dynamic range of the AD/C 2018. If included, design and operation of the unit 2016 are arranged so that in the presence of low signal power noise within the operating bandwidth does not dominate the operation of the AGC unit 2016. Also care may be taken so that the gain contribution of the AGC unit 2016 is compensated in the final Down-link System Link Gain $G_{d1}$ calculations, or the gain value of the AGC 2016 is compensated in the SC unit 2020. If the AGC unit 2016 is not included, the AD/C unit 2018 supplies a suitable dynamic range, which can be as high as 144 dB (24-bits). The AD/C unit 2018 is connected to the Signal Conditioning unit 2020. The Signal Conditioning unit 2020 is programmed to perform such tasks as channel select filtering for the desired operating frequency band, frequency conversion, extraction of reference frequency, signal level estimation, AGC algorithm, WLAN receiver algorithms and any other features that usesignal conditioning and processing. For example, the channel select filters that can be implemented as poly-phased filters can be set for a given operating bandwidth of 1.3, 5, 10 or 15 MHz, operating at any position within the forward-link cellular or PCS or desired frequency spectrum, and set similar to the same parameters as the Network unit 1002. The Signal Conditioning unit 2020 extracts the reference frequency transmitted by the Network unit 1002. The DA/C 2021, which is connected to the Signal Conditioning unit 2020 provides the analogue form of the reference frequency 2023. Where the Network unit 1002 and the User unit 2002 use the mains electricity supply for their operations, it is possible to use the 60 Hz (or 50 Hz) mains oscillations, to "lock" the local oscillators of these two units, to a common frequency source. The 60 Hz or 50 Hz mains oscillations are converted, by suitable circuitry, to the desired frequency, for the operation of the Network unit 1002 and the User unit 2002. The Signal Conditioning unit 2020 clock frequency is derived from a local reference frequency 2023 and provided by clock unit 2022. Depending on the system parameters such as operational bandwidth and load of the supported operations, such as filtering, the Signal Conditioning unit 2020 may be implemented by a variety of technologies such as FPGAs, ASICs and general purpose DSPs such as Texas Instruments TMS320C6416-7E3 processor. The Signal Conditioning unit 2020 includes suitable interfaces and memory. The Signal Conditioning unit 2020 is connected to Digital to Analogue Converter (DA/C) unit 2024. The DA/C unit 2024 is connected to frequency converter unit 2026. The DA/C unit 2024 includes post filtering that is appropriate after the digital to analogue conversion. Frequency converter unit 2026 up-converts the frequencies of the input signal to the desired portion of cellular (or PCS) band of frequencies. The frequency converter unit 2026 includes filtering for correct operation of the transmitter chain. The operating frequency of the frequency converter unit 2026 is set by micro-controller unit 2054. The frequency converter unit 2026 is connected to the variable gain amplifier unit 2028. The gain of the amplifier 2028 is set by the micro-controller unit 2054. The variable gain amplifier unit 2028 is connected to Duplex filter 2030.

The Duplex filter 2030 is also connected to the reverse-link LNA 2038. LNA 2038 is connected to the frequency converter unit 2040. Frequency converter 2040 is connected to Automatic Gain Control (AGC) unit 2042. The frequency converter 2040 converts the frequency band of the incoming signal from the cellular (or PCS) band to baseband, or "near baseband" frequency band. The frequency converter unit 2040 includes filtering for correct operation of the receiver chain. The operating frequency of the frequency converter unit 2040 is set by micro-controller unit 2054. The AGC unit 2042 is connected to Analogue to Digital Converter (AD/C) unit 2044 and the Signal Conditioning unit 2046. The AGC 2042 is optional, and its task is to place the received signal level substantially close to the middle of the dynamic range of the AD/C 2044. If included, design and operation of the unit 2042 are configured so that in the presence of low signal power noise within the operating bandwidth does not dominate the operation of the AGC unit 2042. Also care may be taken so that the gain contribution of the AGC unit 2042 is compensated in the final Up-link System Link Gain, $G_{u1}$ calculations, or the gain value of the AGC 2042 is compensated in the SC unit 2046. If the AGC unit 2042 is not included, the AD/C unit 2044 supplies an appropriate dynamic range, which can be as high as 144 dB (24-bits). The AD/C unit 2044 is connected to the Signal Conditioning unit 2046. The Signal Conditioning unit 2046 performs such tasks as channel select filtering for the desired operating frequency band, frequency conversion, signal level estimation, AGC algorithm, WLAN transmitter algorithms and any other features that use signal conditioning and processing. For example, the channel select filters that can be implemented as poly-phased filters can be set for a given operating bandwidth of 1.3, 5, 10 or 15 MHz, operating at any position within the forward-link U-NII or any desired frequency spectrum and set similar to the same parameters as the Network unit 1002. The Signal Conditioning unit 2046 clock frequency is derived from a local reference frequency 2023 and provided by clock unit 2022. Depending on system parameters such as operational bandwidth and supported operation load, for example filtering, the Signal Conditioning unit 2046 may be implemented by a variety of technologies such as FPGAs, ASICs and general purpose DSPs such as Texas Instruments TMS320C6416-7E3 processor. The Signal Conditioning unit 2046 includes appropriate interfaces and memory. The Signal Conditioning unit 2046 is connected to Digital to Analogue Converter (DA/C) unit 2048. The DA/C unit 2048 is connected to frequency converter unit 2050. The DA/C unit 2048 includes post filtering that is appropriate the digital to analogue conversion. Frequency converter unit 2050 up converts the frequencies of the input signal to the desired portion of U-NII band of frequencies. The frequency converter unit 2050 includes appropriate filtering for the correct operation of the transmitter chain. The operating frequency of the frequency converter unit 2050 is set by micro-controller unit 2054, and therefore Dynamic Channel Allocation (DCA) algorithm can be used to select the best operating frequency band. The frequency converter unit 2050 is connected to the variable gain amplifier unit 2052. The gain of the amplifier 2052 is set by the micro-controller unit 2054 and in most time is set to maximum allowed power for transmission in U-NII band. The variable gain amplifier unit 2052 is connected to Duplex filter 2010.

The Control Link unit 2056 is a radio link between the Network unit 1002 and the User unit 2002. It may be a proprietary link that operates in one of the unlicensed band of frequencies, or may be a standard wireless link such as 802.11b, 802.11a or Bluetooth, designed to operate in unlicensed band. The control link unit 2056 is connected to micro-controller unit 2054 and is able to communicate through an appropriate interface. The control link unit 2056 is also connected to antenna 2058 and 2060 for transmission and reception of the control signals. Note that provided that the antenna bandwidth and operating frequency allow, with minor modifications to unit 2002, antenna units 2004 and 2006 can also be used for the control link unit 2056 operations. Also, with minor modifications to unit 2002, and where the selected operating frequencies allow, the baseband functionality of the control link unit 2056 can be included in the Signal Conditioning units 2046 and 2020 respectively, with the transmit/receive control link unit 2056 signals multiplexed (in frequency or time) with the transmit/receive signals of the forward and reverse User unit 2002, that are transmitted and received by antennas 2004 and 2006.

Micro-controller unit 2054 is a simple micro-processor such as ARM7 or ARM9 with all the appropriate memory and interfaces. The micro-controller unit 2054 is controlling the operation of the Network unit 2002 and may perform some additional signal conditioning and processing such as signal level averaging and estimation. Some of the task of the micro-controller unit 2054 is to set the operating bandwidth and gain of the forward and reverse link network components, and to communicate with the Network unit 1002 in FIG. 12 via the control link unit 2056. Other tasks of the micro-controller 2054 are discussed by way of an example given in FIGS. 10 and 11. Micro-controller unit 2054 is connected to units 2056, 2052, 2050, 2046, 2040, 2028, 2026, 2020 and 2014.

A simple user interface unit 2055, which can be a keypad or simple dipswitch, is connected to micro-controller unit 2054.

Units 2056, 2052, 2050, 2040, 2028, 2026, 2054, 2018, 2044, 2022 and 2014 are all connected to local oscillator unit 2023, or derive their clock and reference frequencies from the local oscillator 2023 signal.

Considering only the reverse-link operation of the Network unit 1002 and the User unit 2002, as an example, the signals received through antenna units 2034 and 2036, are re-transmitted through the antenna units 1004 and 1006, at a higher signal power. These re-transmitted signals can be received again through the antenna units 2034 and 2036 (and have been termed above as the "Up-link Returned-Signal"), causing a signal return path in the system that may cause instability in the operation of the booster. In the digital implementation of the Network unit 1002 and the User unit 2002, it may be possible to reduce the magnitude of the returned signal (Up-link Returned-Signal) by various signal-processing techniques. The choice, design and effectiveness of the illustrative techniques depend on the system parameters and operating conditions. Most known multipath mitigation algorithms can also be applied for return signal reduction, however, due to the extremely small propagation delays between the Network unit 1002 and the User unit 2002, and the limited temporal resolution of the system, the above conventional algorithms may be practically hard and expensive to implement, at best, or ineffective and detrimental, at worst. Therefore, an example of a filtering technique is supplied, for example in the "Channel Filtering" section, where a "deliberate" delay in the re-transmission of the received signal is used, to separate the returned signal (Up-link Returned-Signal), from the original incident signal, at the output of the antenna unit 2034 and 2036 terminators. For example, a delay of about 1 usec, will ensure the time separation of the re-transmitted signal, from the original received signal, and hence the ability to mitigate the re-transmitted signal by the example "Channel Filtering" technique, which is discussed later. The delay can be introduced in the Signal Conditioning unit 1048, provided that there is a digital data buffer of sufficient size available. The Channel Filtering operation can also be performed by the Signal Conditioning unit 1048 (or SC unit 2046), or can be performed by a separate ASIC or FPGA, connected to the AD/C unit 1046, and the Signal Conditioning unit 1024. Alternatively, with minor modifications, the ASIC or the FPGA units can be placed in the User unit 2002, connected to the AD/C unit 2042 and Signal Conditioning unit 2046. The calibration signal can be used for channel estimation purposes, so that the amplitude and the phase of the overall channel response (including the return path) can be estimated, for the setting of the Channel Filter taps. The introduction of Channel Filter in the signal path also has an impact on the operation of the antenna diversity scheme. Channel estimation is performed so that antenna switching operations are synchronized so that, out of possible four channels, only two possible propagation channels exist. Since the antenna switching (selection) is under the control of micro-controller unit 1060 in the Network unit 1002, and micro-controller 2054 in the User unit 2002, channel estimation can be performed for both propagation paths, and two sets of Channel Filter coefficients can be determined for filtering operation. Therefore, it is possible to select (or switch to) the relevant filter coefficients, synchronized and in harmony with the antenna selection operation. The Channel Filtering mechanism is not used to totally mitigate the returned signal but is rather used to suppress the signal sufficiently so that some system gain is possible for the signal boosting operation. The introduction of the "deliberate delay" may also be used in conjunction with any other known signal-processing algorithm.

The above discussion is also relevant to the forward-link of the Network unit 1002 and the User unit 2002, and therefore the above "delay" and "Channel Filtering", with the aid of the forward-link calibration signal (not included in the FIGS. 12 and 13) is performed in the forward-link of the Network unit 1002 (or User unit 2002).

Other techniques, such as the use of vertical polarization for antenna units 1004 and 1006, and horizontal polarization for antennas 2034 and 2036 can further improve the system performance. It is also possible to improve system performance by the use of directional antennas, as in conventional booster and repeater systems.

The control-flow description given for FIGS. 7, 8, 9, 10 and 11, with minor modifications, can also be used for the digital implementation of the Network unit 1002 and User unit 2002, which is discussed above in FIGS. 12 and 13.

Figure 15:
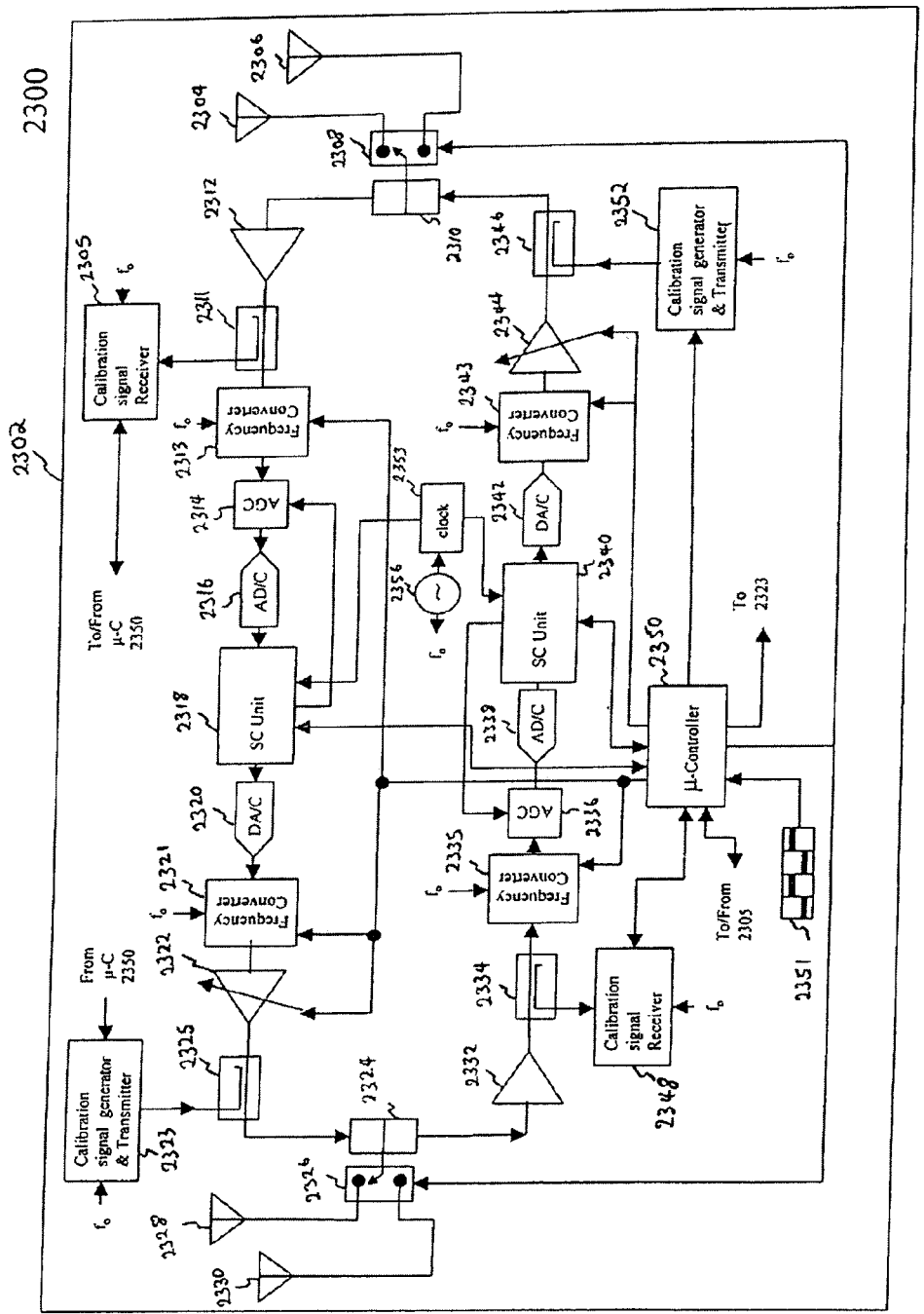
FIG. 15 is a schematic block diagram showing an embodiment of a digital implementation of a back-to-back repeater.

The illustrative description is only an example of how the system may be implemented, and is not the only possible method and solution. Several points are noted, as follows:

1. The Network unit 1002 may control several User units, such as the User unit 2002. In such setups, the example control flow, shown in FIGS. 7, 8, 9, 10 and 11 may be modified such that the Network Unit 1002 can initialize each User unit independently. For stable operation, the reverse-link Network unit 1002 variable gain amplifier unit 1054 gain is set for minimum Up-link System Path Loss, $PL_{u1}$, for operation with all the active User units. Thus, if the Down-link System Path Loss, $PL_{d1}$, is based on the Up-link System Path Loss, $PL_{u1}$, calculations (i.e. $PL_{d1} \approx PL_{u1}$), the minimum variable gain amplifier unit 2028 gain is used for all the User units in the forward-link under the control of the Network unit 1002.
2. Another modification for multiple User unit (several User units 2002) operation is that the final Down-link System Path Loss, $PL_{d1}$, and the Up-link System Path Loss, $PL_{u1}$, measurements should be carried out with all User units, under the control of the Network unit 1002 (including Network unit 1002 itself), active such that aggregate signal power levels do not exceed the desired Down-link System Link Gain, $G_{d1}$, or the desired Up-link System Link gain, $G_{u1}$. If combined signal from the User Units exceeds the acceptable level for either of the reverse or forward system link gains, the appropriate amplifier gains are reduced in iterative step increments to such level that the maximum allowed system link gain, or the forward and the reverse links are met.
3. Additional hardware may be included, similar to the calibration signal generator and transmitter 1058, and the calibration signal receiver 1016 in the forward-link path of either the Network unit 1002 or in the User unit 2002 to assess the Down-link System Path Loss, $PL_{d1}$, independently (for each User unit 2002 controlled by Network unit 1002).
4. Although the signal path in both the Network unit 1002 and the User unit 2002, in the forward link, is constantly active, to boost the beacon (BCCH in GSM) transmissions of the base stations, the reverse-link path signal path of the Network unit 1002 and the User unit 2002 may be inactive, unless a substantial signal level is detected (i.e. "gated"). Therefore, in the User unit 2002, based on the received signal power level on reverse-link, which can be measured after the LNA unit 2038 or in Signal Conditioning unit 2046, the micro-controller unit 2054 switches the VG amplifier unit 2052 "OFF" and if the signal power level is below the desired threshold, or "ON" if the signal power level is above the desired threshold. Equally, in the Network unit 1002, based on the received signal power level on reverse-link, which can be measured after the LNA unit 1040 or in Signal Conditioning unit 1048, the micro-controller unit 1060 switches the VG amplifier unit 1054 "OFF" and if the signal power level is below the desired threshold, or "ON" if the signal power level is above the desired threshold. Care is taken that the reverse-link "gated" operation does not interfere with the calibration signal path and mechanism involving the units 1058 and 1026. Therefore, either the "gated" operation is replaced by continuous operation during the calibration process, or, where possible, a forward-link calibration is placed and used in a manner similar to the reverse-link mechanism for both Down-link System Path Loss, $PL_{d1}$, and Up-link System Path Loss, $PL_{u1}$, calculations.
5. With certain modifications in the hardware and the control software, it is possible to merge the Network unit 1002 and the User unit 2002 into a single unit, connected "back-to-back". The design and operation of the back-to-back option is shown in FIG. 15 and discussed later.
6. It is also possible to transmit the unique Network unit 1002 identity code, and optionally device location, to the cellular network. The information can be used to locate a user in an indoor environment, for example by generating a heavily coded (protected), low bit rate data, containing a long known preamble, the unique identity code and optionally the longitude and the latitude of the Network unit 1002. The information can then be pulse-shaped for low spectral leakage and superimposed on the reverse-link signal of a given channel by an appropriate modulation scheme, within the Network unit 1002. The choice of the modulation scheme depends on the operating cellular system. For example, for GSM, which enjoys a constant envelope modulation such as GMSK, amplitude modulation (with low modulation index) can be used. For CDMA systems, with fast reverse-link power control, DBPSK can be used as the modulation scheme. Extraction of information from the received channel signal at base station may be improved by base station receiver modifications, but does not affect normal operation of the cellular link.

The noted points are applicable to many different digital booster implementations.

Back-To-Back Booster

In a Back-to-Back arrangement, transmission and reception in U-NII band and the control link that exists between the Network unit 602 and the User unit 702 is superfluous. FIG. 14 depicts an analogue implementation example of such an arrangement, where the booster is placed where good signal coverage exists, indoor or outdoors. The back-to-back unit 2252 consists of antennas 2254, 2256, 2282 and 2280, all operating in the cellular spectrum of interest. Antennas 2254 and 2256 are connected to the RF switch 2258, where antenna switched diversity operation for transmit and receive operation is provided as discussed for Network unit 602 and User unit 702. In the forward-link, the RF switch unit 2258 is connected to the duplex filter unit 2260. The duplex filter unit 2260 is connected to the LNA 2288 in the Forward-link unit 2264. The LNA 2288 is connected to the filter unit 2286. The bandpass filter unit 2286 can be designed to pass all or a desired part of the interested cellular spectrum, or can be a bank of overlapping bandpass filters, covering the full spectrum of the interested cellular system, with a RF switch, such that the desired band and bandwidth, can be selected. Filter unit 2286 is connected to the variable gain amplifier 2284. The gain of the VG amplifier unit 2284 is set by micro-controller unit 2270. The variable gain amplifier unit 2284 is connected to the duplex filter 2276. The duplex filter 2276 is connected to RF switch 2278. The antennas 2282 and 2280 are both connected to the RF switch 2278. On the reverse-link, the RF switch unit 2278 is connected to the duplex filter 2276. The duplex filter unit 2276 is connected to directional coupler unit 2274. The directional coupler unit 2274 is connected to calibration signal receiver 2272 and LNA 2290 in the Reverse-link unit 2266. The calibration signal receiver unit 2272 which is coupled to the reverse-link receive path of the booster unit 2252, by directional coupler 2272, using the known PN code and the transmit code phase is then capable of detecting and demodulating the calibration signal transmitted by unit 2268, which has entered the reverse-link path via the mentioned closed-loop mechanism that exists between the antenna units 2254, 2256 and the antenna units 2280, 2282. The calibration signal receiver unit 2272 is capable of establishing the received signal strength, which is then used to estimate the Up-link System Path Loss, $PL_{u1}$. The LNA 2290 is connected to filter unit 2292, which is connected to variable gain amplifier unit 2294. The bandpass filter 2292 can be designed to pass all or a desired part of the interested cellular spectrum, or can be a bank of overlapping bandpass filters, covering the full spectrum of the interested cellular system, with a RF switch, such that the desired band and bandwidth can be selected. The gain of the VG amplifier unit 2294 is set by micro-controller unit 2270. The variable amplifier 2294 is connected to directional coupler unit 2262. Directional coupler unit 2262 is connected to the calibration signal generator and transmitter unit 2268, and duplex filter 2260. The micro-controller 2270 is connected to calibration signal generator and transmitter unit 2268, the calibration signal receiver 2272, the Reverse-link unit 2266 and Forward-link unit 2264. A simple user interface unit 2271, which can be a keypad or simple dipswitch, is connected to micro-controller unit 2270.

Although many functional units of the Network unit 602 and the User unit 702 can be eliminated in the back-to-back unit 2252, operation and the remaining units of the booster remain fundamentally the same as the one described for the Network unit 602 and User unit 702. Calibration signal transmission and reception are shown just for the Reverse-link. However, the same mechanism can be placed for the forward-link if desired, which also results in better system performance. Since the antenna units 2254, 2256, 2282 and 2280 are placed close to each other, antenna isolation can be provided by highly directional antennas, with increased front-to-back radiation ratios.

The unique unit 2252 identity code and optionally device location can be transmitted to the cellular network. The information can be used to locate a user in an indoor environment, for example by generating a heavily-coded (protected), low bit rate data, containing a long known preamble, the unique identity code and optionally the longitude and the latitude of the unit 2252. The information can then be pulse-shaped for low spectral leakage and superimposed on the reverse-link signal of a given channel by an appropriate modulation scheme, within the unit 2252. Choice of the modulation scheme depends on the operating cellular system. For example, for GSM, which enjoys a constant envelope modulation such as GMSK, amplitude modulation (with low modulation index) can be used. For CDMA systems, with fast reverse-link power control, DBPSK can be used as the modulation scheme. Extraction of the illustrative information from the received channel signal at base station may involve base station receiver modifications, but does not effect normal operation of the cellular link.

FIG. 15 depicts a digital implementation example of Back-to-Back arrangement, where the booster is placed where good signal coverage exists, indoor or outdoors. The back-to-back unit 2302 consists of antennas 2304, 2306, 2328 and 2330, all operating in the cellular spectrum of interest. Antennas 2304 and 2306 are connected to the RF switch 2308, where antenna switched diversity operation for transmit and receive operations is provided as discussed for Network unit 1002 and User unit 2002. In the forward-link, the RF switch unit 2308 is connected to the duplex filter unit 2310. The RF switch unit 2308 is also connected to micro-controller 2350. The duplex filter unit 2310 is connected to the LNA 2312. The directional coupler unit 2311 is connected to output of the LNA 2312, and the calibration receiver unit 2305. The calibration receiver 2305 is also connected to micro-controller 2350. The directional coupler unit 2311 is also connected to the frequency converter unit 2313. Frequency converter 2313 is connected to Automatic Gain Control (AGC) unit 2314. The frequency converter 2313 converts the frequency band of the incoming signal from the cellular band to baseband, or "near baseband" frequency band. The frequency converter unit 2313 includes filtering for the correct operation of the receiver chain. The operating frequency of the frequency converter unit 2313 is set by micro-controller unit 2350. The AGC unit 2314 is connected to Analogue-to-Digital Converter (AD/C) unit 2316. The AGC 2314 is optional, and its task is to place the received signal level substantially close to the middle of the dynamic range of the AD/C 2316. If included, design and operation of unit 2314 are configured so that in the presence of low signal power, noise within the operating bandwidth does not dominate the operation of the AGC unit 2314. Also care is taken so that the gain contribution of the AGC unit 2314 is compensated in the final Down-link System Link Gain, $G_{d1}$ calculations, or alternatively the gain value of the AGC 2314 is compensated in the SC unit 2318. If the AGC unit 2314 is not included, the AD/C unit 2316 supports a suitable dynamic range, which can be as high as 144 dB (24-bits). The AD/C unit 2316 is connected to Signal Conditioning unit 2318. The Signal Conditioning unit 2318 performs such tasks as channel select filtering for the desired operating frequency band, frequency conversion, signal level estimation, AGC algorithm, and any other features that usesignal conditioning and processing. For example, the channel select filters that can be implemented as poly-phased filters can be set for a given operating bandwidth of 1.3, 5, 10 or 15 MHz, operating at any position within the forward-link cellular or PCS or desired frequency spectrum. Depending on the system parameters such as operational bandwidth and supported operation load, for example filtering, the Signal Conditioning unit 2318 may be implemented by a variety of technologies such as FPGAs, ASICs and general purpose DSPs such as Texas Instruments TMS320C6416-7E3 processor. The Signal Conditioning unit 2318 includes appropriate interfaces and memory. The Signal Conditioning unit 2318 is connected to Digital-to-Analogue Converter (DA/C) unit 2320. The DA/C unit 2320 includes post filtering that is appropriate the digital to analogue conversion. The DA/C unit 2320 is connected to frequency converter unit 2321. Frequency converter unit 2321 up-converts the frequencies of the input signal to the original band of cellular frequencies. The frequency converter unit 2321 includes appropriate filtering for the correct operation of the transmitter chain. The operating frequency of the frequency converter unit 2321 is set by micro-controller unit 2350. The frequency converter unit 2321 is connected to the variable gain amplifier unit 2322, which is connected to the directional coupler unit 2325. The gain of the VG amplifier unit 2322 is set by micro-controller unit 2350. The directional coupler unit 2325 is connected to the calibration signal generator and transmitter unit 2323 and the duplex filter 2324. The calibration signal generator and transmitter unit 2323 is also connected to the micro-controller 2350. The duplex filter 2324 is connected to RF switch 2326. The antennas 2328 and 2330 are both connected to the RF switch 2326.

On the reverse-link, the RF switch unit 2326 is connected to the duplex filter 2324. The RF switch unit 2326 is also connected to micro-controller 2350. The duplex filter unit 2324 is connected to LNA unit 2332. The LNA unit 2332 is connected to the directional coupler unit 2334. The directional coupler unit 2334 is connected to the frequency converter unit 2335. Frequency converter 2335 is connected to Automatic Gain Control (AGC) unit 2336. The frequency converter 2335 converts the frequency band of the incoming signal from the cellular band to baseband, or "near baseband" frequency band. The frequency converter unit 2335 includes filtering for the correct operation of the receiver chain. The operating frequency of the frequency converter unit 2335 is set by micro-controller unit 2350. The directional coupler unit 2334 is also connected to calibration signal receiver unit 2348. The frequency converter unit 2335 is connected to AGC unit 2336. The AGC unit 2336 is connected to Analogue-to-Digital Converter (AD/C) unit 2338. The AGC 2336 is optional, and its task is to place the received signal level substantially close to the middle of the dynamic range of the AD/C 2338. If included, design and operation of the unit 2336 are configured so that in the presence of low signal power, noise within the operating bandwidth does not dominate the operation of the AGC unit 2336. Also care is taken so that the gain contribution of the AGC unit 2336 is compensated in the final Up-link System Link Gain, $G_{u1}$ calculations, or alternatively the gain value of the AGC 2336 is compensated in the SC unit 2340. If the AGC unit 2336 is not included, the AD/C unit 2338 supports a suitable dynamic range, which can be as high as 144 dB (24-bits). The AD/C unit 2338 is connected to Signal Conditioning unit 2340. The Signal Conditioning unit 2340 performs such tasks as channel select filtering for the desired operating frequency band, frequency conversion, signal level estimation, AGC algorithm, and any other features that use signal conditioning and processing. For example, the channel select filters that can be implemented as poly-phased filters can be set for a given operating bandwidth of 1.3, 5, 10 or 15 MHz, operating at any position within the forward-link cellular or PCS or desired frequency spectrum. Depending on the system parameters such as operational bandwidth and the load of the supported operations, such as filtering, the Signal Conditioning unit 2340 may be implemented by a variety of technologies such as FPGAs, ASICs and general purpose DSPs such as Texas Instruments TMS320C6416-7E3 processor. The Signal Conditioning unit 2340 includes appropriate interfaces and memory. The Signal Conditioning unit 2340 is connected to Digital-to-Analogue Converter (DA/C) unit 2342. The DA/C unit 2342 includes post filtering that is appropriate the digital to analogue conversion. The DA/C unit 2342 is connected to the Frequency converter unit 2343, which up-converts the frequencies of the input signal to the desired portion of cellular or PCS band of frequencies. The frequency converter unit 2343 includes filtering for the correct operation of the transmitter chain. The operating frequency of the frequency converter unit 2343 is set by micro-controller unit 2350. The frequency converter unit 2343 is connected to the variable gain amplifier unit 2344, which is connected to the directional coupler unit 2346. The gain of the VG amplifier unit 2344 is set by micro-controller unit 2350. The directional coupler unit 2346 is connected to the duplex filter 2310. The duplex filter 2310 is connected to RF switch 2308. The antennas 2304 and 2306 are both connected to the RF switch 2308. A simple user interface unit 2351, which can be a keypad or simple dipswitch, is connected to micro-controller unit 2350. Units 2305, 2323, 2313, 2321, 2348, 2335, 2343, 2352 and 2350 are all connected to local oscillator unit 2356, or derive their clock or reference frequencies from the local oscillator 2356. The Signal Conditioning units 2318 and 2340 clock frequencies are derived from a local reference frequency 2356 provided by clock unit 2353.

Although, many functional units of the Network 1002 and the User 2002 units can be omitted in the back-to-back unit 2302, the operation and the function of the most of the units of the booster 2302 remain fundamentally the same as the one described for the Network unit 1002 and User unit 2002. As before, the calibration signal transmission and reception are shown just for the reverse-link. In the digital implementation of booster unit 2302, the functional blocks for calibration signal generator and transmitter unit 2352, and the calibration receiver unit 2348 can be included in the Signal Conditioning unit 2340 for the uplink, and in the Signal Conditioning unit 2318 for the downlink operation. Since the antenna units 2304, 2306, 2328 and 2330 are placed close to each other, antenna isolation can be provided by highly directional antennas, with increased front-to-back radiation ratios.

Considering only the reverse-link operation of the booster 2303, as an example, the signals received through antenna units 2328 and 2330 are re-transmitted through the antenna units 2304 and 2306, at a higher signal power. These re-transmitted signals can be received again through the antenna units 2330 and 2328 (and have been termed above as the "Up-link Returned-Signal"), causing a signal return path in the system that may cause instability in the operation of the booster. In the digital implementation of the booster unit 2302, it may be possible to reduce the magnitude of the returned signal (Up-link Returned-Signal) by various signal-processing techniques. The choice, design and effectiveness of a technique depends on system parameters and operating conditions. Most known multi-path mitigation algorithms can also be applied for return signal reduction, however, due to the extremely small propagation delays between the antenna units 2304, 2306 and the antenna units 2328, 2330, and the limited temporal resolution of the system, conventional multi-path mitigation algorithms may be practically hard and expensive to implement, at best, or ineffective and detrimental, at worst. Therefore, an example of a filtering technique is provided for example in the "Channel Filtering" section, where a "deliberate" delay in the re-transmission of the received signal is used, to separate the returned signal (Up-link Returned-Signal), from the original incident signal, at the output of the antenna unit 2328 and 2330 terminators. A delay of about 1 usec will ensure the time separation of the re-transmitted signal from the original received signal, and hence the ability to mitigate the re-transmitted signal, by the example channel filtering technique. The delay can be introduced in the Signal Conditioning unit 2340, provided that there is a digital data buffer of sufficient size available. The Channel Filtering operation can also be performed by the Signal Conditioning unit 2340, or can be performed by a separate ASIC or FPGA, connected to the AD/C unit 2338, and the Signal Conditioning unit 2340. The calibration signal can be used for channel estimation purposes, so that the amplitude and the phase of the overall channel response (including the return path) can be estimated, for the setting of the Channel Filter taps. The introduction of Channel Filter in the signal path also has an impact on the operation of the antenna diversity scheme. Because channel estimation is performed, antenna switching operations are synchronized so that, out of possible four, only two possible propagation channels exist. Since the antenna switching (selection) is under the control of micro-controller unit 2350, channel estimation can be performed for both propagation paths, and two sets of Channel Filter coefficients can be determined for filtering operation. Therefore, it is possible to select (or switch to) the relevant filter coefficients, synchronized and in harmony with the antenna selection operation. The Channel Filtering mechanism is not used to totally mitigate the returned signal but rather to suppress the signal sufficiently so that some system gain is possible for the signal boosting operation. Introduction of the "deliberate delay" may also be used in conjunction with any other known signal-processing algorithm.

The above discussion is also relevant to the forward-link of the booster unit 2302, and therefore the above "delay" and "Channel Filtering" are performed in the forward-link as well.

Other techniques, such as the use of vertical polarization for antenna units 2304 and 2306, and horizontal polarization for antennas 2328 and 2330 can further improve the system performance. It is also possible to improve system performance by the use of directional antennas, as in conventional booster and repeater systems.

It is also possible to transmit the unique unit 2302 identity code, and optionally device location, to the cellular network. The information can be used to locate a user in an indoor environment, for example by generating a heavily coded (protected), low bit rate data, containing a long known preamble, the unique identity code and optionally the longitude and the latitude of the unit 2302. The information can then be pulse-shaped for low spectral leakage and superimposed on the reverse-link signal of a given channel by an appropriate modulation scheme, within the unit 2302. The choice of the modulation scheme depends on the operating cellular system. For example, for GSM, which enjoys a constant envelope modulation such as GMSK, amplitude modulation (with low modulation index) can be used. For CDMA systems, with fast reverse-link power control, DBPSK can be used as the modulation scheme. Extraction of information from the received channel signal at base station may involve base station receiver modifications, but does not effect the normal operation of the cellular link.

Figure 16:
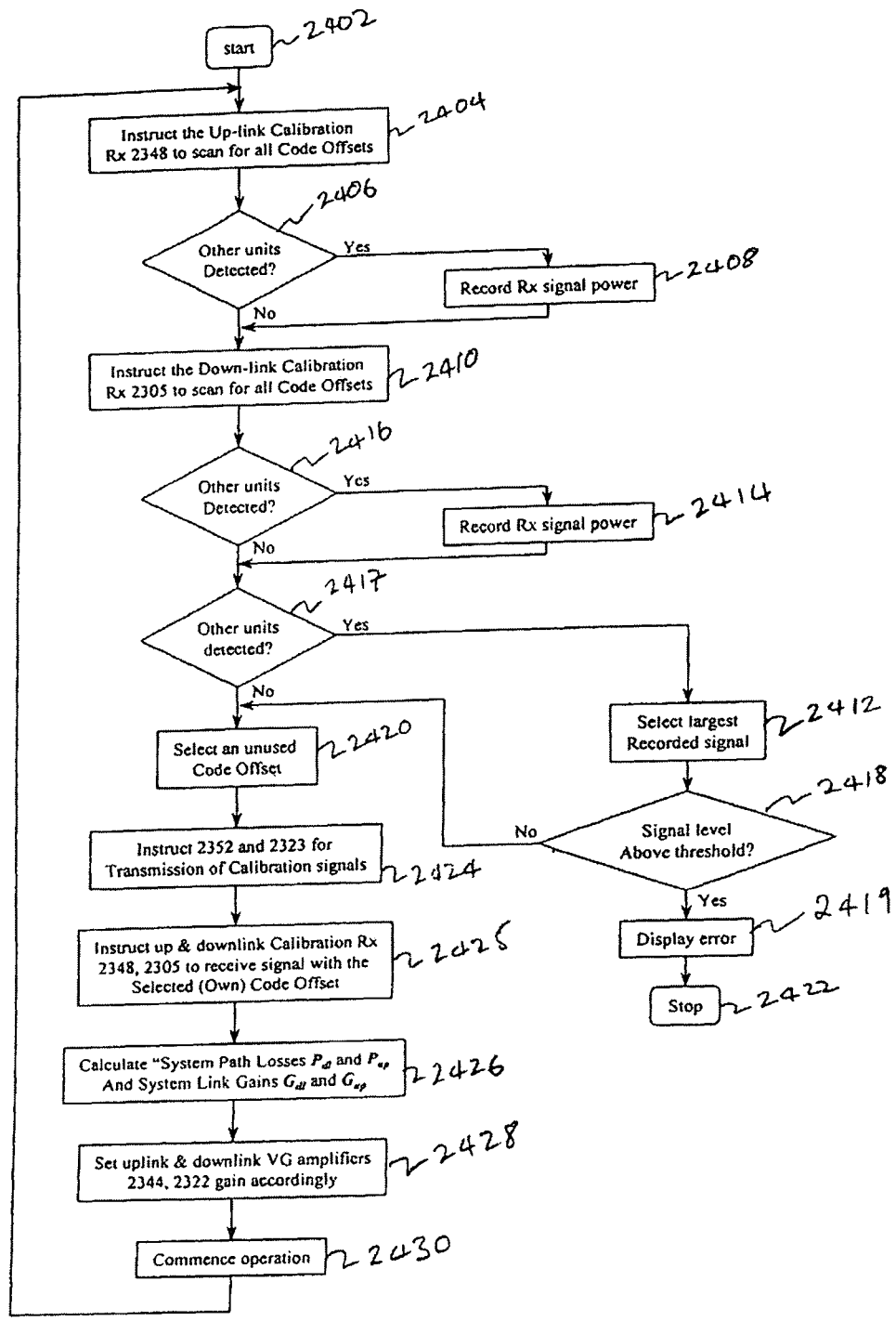
FIG. 16 is a flow chart showing an embodiment of operation flow of a back-to-back repeater.

An example of the system operational flow diagrams is shown in the FIG. 16. With reference to FIGS. 15 and 16, on "power-up" or "reset" of the booster unit 2303, the VG amplifiers 2322 and 2344 gain are always set to minimum and are switched "OFF". The system is said to be "operational" when VG amplifiers 2322 and 2344 are switched "ON", after the correct gain setting by instruction from micro-controller 2350. Also, on "power-up" or "reset" action, the operation starts (step 2402), with the micro-controller 2350 instructs the reverse-link calibration receiver 2348 to scan for all possible code offsets (step 2404). If a substantial signal power transmitted by other units, operating within the same geographical area, is detected by the receiver unit 2348 (step 2406), the received signal powers are stored (step 2408). If no substantial signal is detected (step 2410), the micro-controller 2350 instructing the forward-link calibration receiver 2305 to scan for all possible code offsets (step 2410). If a substantial signal power transmitted by other units, operating within the same geographical area, is detected by the receiver unit 2305 (step 2416), the received signal powers are stored (step 2414). After the test for all possible code offsets is finished for the forward and reverse links of the system, and if other units signal power detected (step 2417), the received signals for each offset are tested and the largest signal power is selected (step 2412). If the selected signal power is above a safe threshold (step 2418), the unit 2302 displays an error message (step 2419) and stops operation (step 2422). If the selected signal power is below the safe threshold, the unit proceeds to step 2420. If no substantial signal is detected or the detected signals are below the safe threshold (step 2416), the micro-controller 2350 selects an unused code offset (step 2420) and instructs both the forward and reverse link calibration signal generator and transmitter units 2323 and 2352, which have not been transmitting so far, to commence transmission (step 2424). The micro-controller 2350 also instructs the forward and reverse calibration receivers 2305, 2348 to receive signal with the selected code offset (step 2425). Based on the forward and reverse calibration receivers 2305, 2348 outputs, the micro-controller 2350 calculates the Up-link and Down-link system gains, $G_{u1}$ and $G_{d1}$, and the subsequent variable amplifier gains for the forward and reverse links (step 2426). Micro controller 2350 sets the gains of the forward and reverse link variable gain amplifier units 2322 & 2346 to the calculated levels, which so far have been at a minimum and "OFF" (step 2428). The system commences full operation (step 2430), with the variable gain amplifier units 2322 & 2346 switched "ON".

Channel Filtering Example

Figure 17:
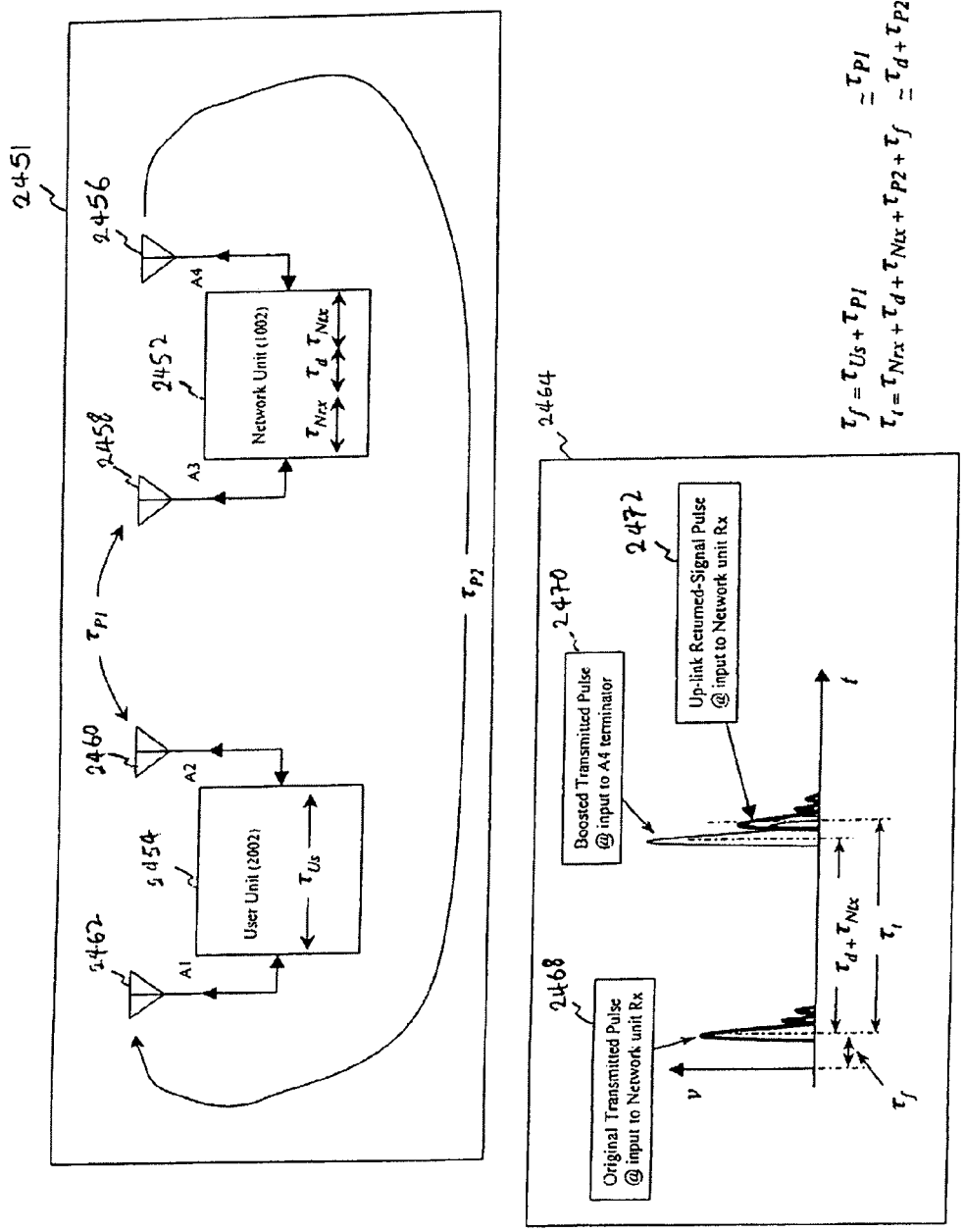
FIGS. 17 and 18 are a simplified block diagram to illustrate a channel filtering operation.

The example provided here can be applied to the booster system described here to combat the effect of mentioned feed-back loop and the above mentioned Up-link Returned-Signal that may exist in the reverse-link of the system and Down-link Returned-Signal that may exist in the forward-link of the system. The "Channel Filtering" technique, discussed here, for the forward and the reverse links is autonomous and can either be applied to both or just one of the forward or the reverse links of the system, and can be implemented in the Network unit 1002 or the User unit 2002, or both. To explain the working of Channel filtering, a simplified block diagram of the booster is shown in FIG. 17, and only the reverse-link operation is discussed for the Network unit 1002 and User unit 2002 (the Channel Filtering discussed here is applicable to all digital implementations). In the representation, no antenna diversity is assumed for either the Network unit 2452 (which is substantially similar to 1002 in FIG. 12) or the User unit 2454 (which is substantially similar to 2002 in FIG. 13). The processing and propagation delays within the booster system can be categorized as the following:

$\tau_{Us}$=the User unit 2454 processing delay (relatively negligible).

$\tau_{P1}$=the unlicensed band propagation delay.

$\tau_{Nrx}$=the Network unit 2452 receiver processing delay (relatively negligible).

$\tau_{Ntx}$=the Network unit 2452 transmitter processing delay (relatively negligible).

$\tau_d$=the "deliberate" delay introduced in the transmission path of the Network unit 2452.

$\tau_{P2}$=the licensed band propagation delay of the Up-link Returned-Signal.

The overall impulse response of the booster unit 2451 is shown in 2464. The original incident pulse, entering from antenna 2462 (A1), arrives at the input to the Network unit 2452 receiver after a delay of $\tau_f$ (the pulse is marked as 2468), where:

$$\tau_f = \tau_{Us} + \tau_{P1} \cong \tau_{P1}$$

The pulse is amplified and transmitted 2470, after the "deliberate" time delay $\tau_d$, from antenna 2456 (marked A4 in FIG. 17). The transmitted signal re-enters the antenna 2462 (A1) after the propagation delay $\tau_{P2}$, and arrives at the input to the Network unit 2452 receiver after a delay of $\tau_t$ (marked as 2472). So the overall delay for the Up-link Returned-Signal at the input to the Network unit 2452 receiver can be stated as $\tau_t$ and is substantially equal to:

$$\tau_t = \tau_{Nrx} + \tau_d + \tau_{Ntx} + \tau_{P2} + \tau_f \approx \tau_d + \tau_{P1} + \tau_{P2}$$

The returned pulse 2472 is delayed by the propagation path delays $\tau_{P1}$ and $\tau_{P2}$, which can be very small in the booster's operating environment. The "deliberate" delay is introduced to sufficiently separate the Up-link Returned-Signal from the original incident pulse, such that filter coefficients can be estimated easily, and filtering can be performed more effectively. Introduction of another "deliberate" delay in the transmit path of the User unit 2454 ensures separation of the boosted transmitted pulse and the Up-link Returned-Signal, a condition that may be desirable to reduce the effect of the multipath experienced by the boosted transmitted pulse on the operation of the Channel filtering.

Figure 18:
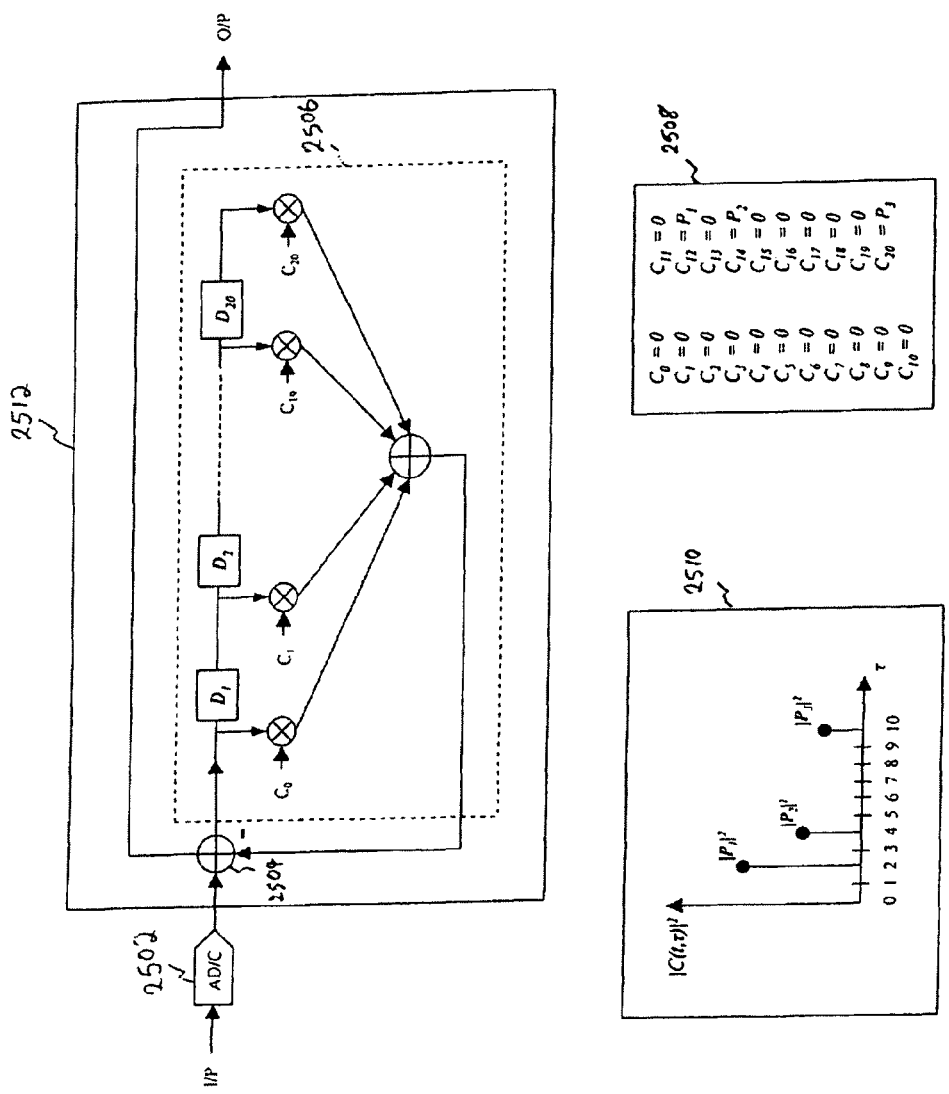

In the example here, the "Channel Filtering" unit 2512 (in FIG. 18) is placed only on the reverse-link of the Network unit 1002. The channel filtering process involves estimating the complex propagation channel impulse response, including amplitude and phase for all time delays, up to the maximum expected multipath delay. The complex channel impulse response, $C(t,\tau)$, can be provided by the calibration signal receiver unit 1016 shown in FIG. 12, as the information is readily available at the output of the unit, for the reverse-link path of the system. Note that based on the described design of the calibration signal mechanism shown in FIG. 12 (also FIG. 15), the channel impulse response, provided by the calibration signal receiver unit 1016, will not include the delay contributions of the "deliberate" delay $(\tau_d)$, and the $\tau_{Nrx} + \tau_{Ntx}$ components. While $\tau_{Nrx} + \tau_{Ntx}$ is sufficiently small to ignore, the "deliberate" delay $(\tau_d)$ is added in the overall impulse response, in the Network unit 1002, for the estimation of the Channel Filter coefficients. Similarly, if Channel Filtering operation is also used for the forward-link, a separate complex channel impulse response is used for the link. As a result, a similar calibration technique to the reverse-link is performed on the forward-link. An example of the estimated power of the channel impulse response, $C(t\tau)$, 2510, at the output of the calibration signal receiver 1016 is shown in FIG. 18. The impulse response 2510 is for a maximum delay of 1 usec, assuming a calibration signal PN code chipping rate of 5 Mchips/sec and 2 samples per chip. In FIG. 18, $C(t,\tau)$ 2510 has three substantial distinguishable propagation paths at delays of 0.2 (P1), 0.4 (P2) and 1.0 (P3) usec respectively. The maximum expected time delay corresponds to a signal path of about 300 meters, which is reasonable for the booster range and operational environment. The 1.0 usec maximum time delay, together with a "deliberate delay of 1 usec ($\tau_d$=1 usec), may be implemented using a 21-tap complex FIR filter, with half-chip tap spacing, for Channel Filtering operation. FIG. 18 shows the Channel Filter unit 2512. The Channel Filter unit 2512 has a 21-tap FIR filter 2506, with tap delay of D=0.1 usec spacing, and with the variable complex coefficients set to the values shown in table 2508. The FIR filter 2506 output is connected to one of the inputs of the adder unit 2504, and the input of the FIR filter unit 2506 is connected to the output of the adder unit 2504. The other input of the adder unit 2504 is connected to the AD/C 2502. In the example, the AD/C is the unit 1046 in FIG. 12. The FIR filter 2506 will produce a replica of the received signal, at the desired time delay with the respective complex coefficient specifying the magnitudes and the phases of the received Up-link Returned-Signal, to "wipe off" the incoming first (P1), second (P2) and third (P3) return signal components. The FIR filter 2506 can either be implemented by a FPGA, ASIC or by the Signal Conditioning unit 1048 in FIG. 12. The processes of channel estimation, $C(t,\tau)$, and hence up-dating the FIR filter 2506 filter coefficients, are performed continuously, with an update rate that depends on the channel coherence time. For the example, a value of 100 msec can be assumed, as the indoor channels exhibit large coherence time. Alternatively, it is possible to use an adaptive algorithm such as Normalized LMS (NLMS), or RLS, converging on the received calibration signal at the Network unit 1002, to estimate the filter coefficients, on an on-going basis.

Wire Connected Booster

Figure 19:
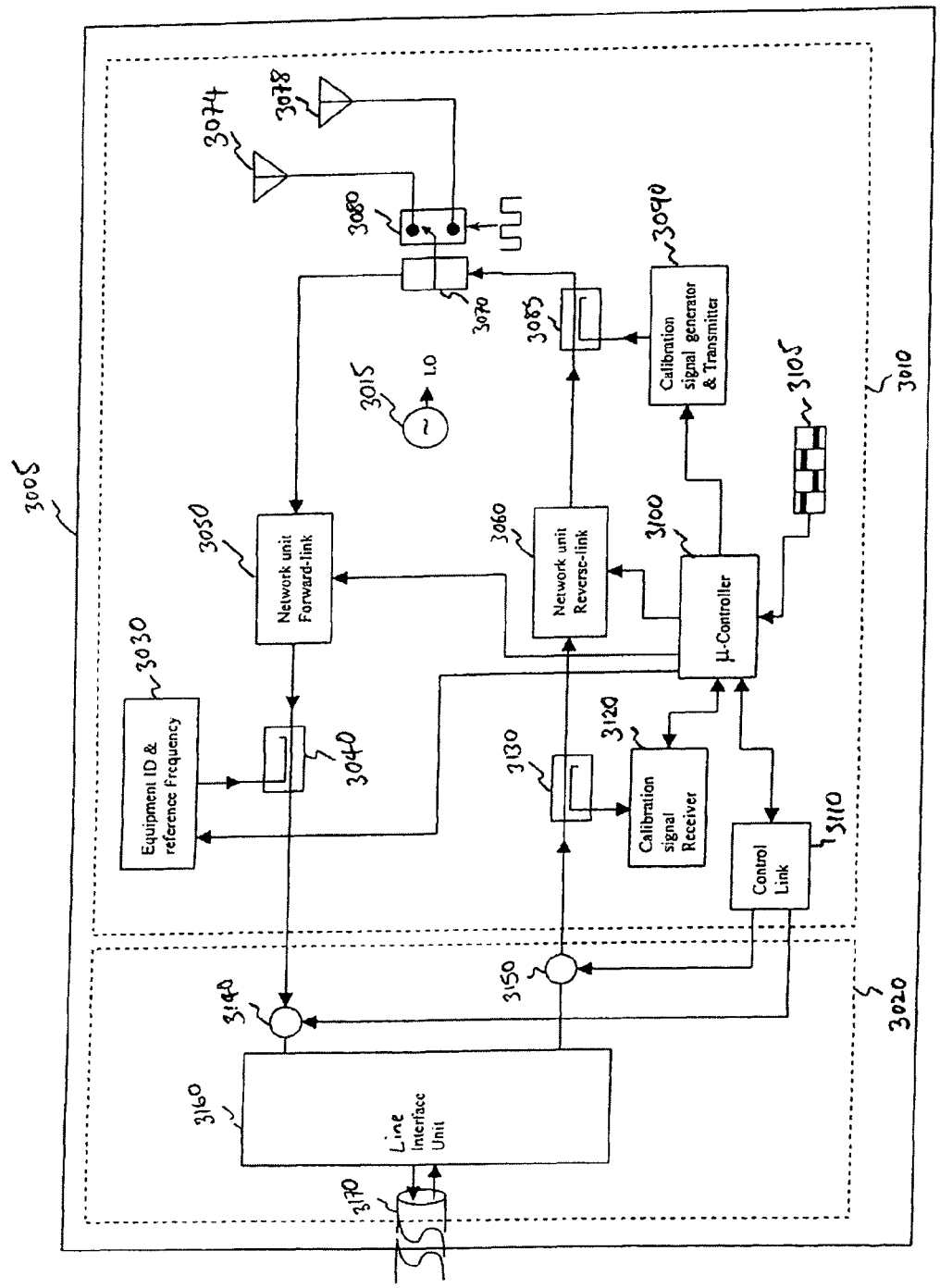
FIGS. 19-22 are schematic block diagrams showing other repeater embodiments.

FIG. 30 shows an example of analogue implementation of the Network unit 600 using a transmission cable as the physical medium for communication with the User unit 20 (702 in FIG. 6). The Network unit 602 shown in FIG. 5 is modified to the unit 3005 shown in FIG. 30 to transmit to, and receive signals from, the User unit 4005 (FIG. 20), which is modified version of the User unit 702 shown in FIG. 6, over a cable capable of supporting the operating bandwidth and the frequencies of the Network unit 3005 and User unit 4005 signals. The cable interface unit 3020 consists of a line interface unit 3160 which is connected to the transmission/reception cable 3170 and two hybrid combiners 3140 and 3150 on the forward-link and 3150 on the reverse link of the Network sub unit 3010. The line interface unit 3160 will provide the means for the load matching for connection to a transmission line 3170, and other appropriate components such as the amplifiers, modulation and frequency converters (modem functionalities), for reliable transmission over the transmission line 3170. The design of the line interface unit 3160 is dependent on the transmission line 3170 characteristics, and is well known in the art. For example, even the in-building power lines or telephone lines can be used as the transmission line 3170 (as in homePNA), where the line interface unit 3160 is designed for such operation. The hybrid combiner (or directional coupler) 3140 is used to combine the control link 3110 signal with the forward-link signal. Alternatively, the outputs of the directional coupler unit 3040 and the control link unit 3110 can directly be connected to line interface unit 3160, where they are modulated on adjacent carriers for simultaneous transmission to the User unit 4005. The hybrid combiner (or directional coupler) 3150 is used to extract sufficient signal for reception and detection of control link 3110 received signal. Alternatively, the inputs to the directional coupler unit 3130 and the control link unit 3110 can directly be connected to line interface unit 3160, if the control and data signals are modulated on adjacent carriers for simultaneous transmission from the User unit 4005. It is also possible to use hybrid combiners instead of the directional couplers 3040, 3130 and 3085. It is also possible, and is more desirable, to place the Reverse-link Network unit 3060 receiver internal LNA amplifier before the directional coupler 3130 (or the hybrid combiner replacement), in FIG. 19.

The operation of the units 3015, 3030, 3050, 3120, 3110, 3060, 3100, 3105, 3070, 3074, 3078, 3080, 3085, 3040, 3130 and 3090 in FIG. 30 is similar, in operation and description, to 640, 624, 604, 620, 628, 606, 626, 627, 614, 610, 608, 612, 618, 630, 616 and 622 respectively, as discussed for FIG. 5. In the modified Network unit 3005, the directional coupler 3040

(630 in FIG. 5) is connected to hybrid combiner 3140, and the directional coupler 3130 (616 in FIG. 5) is connected to hybrid combiner 3150.

Figure 20:
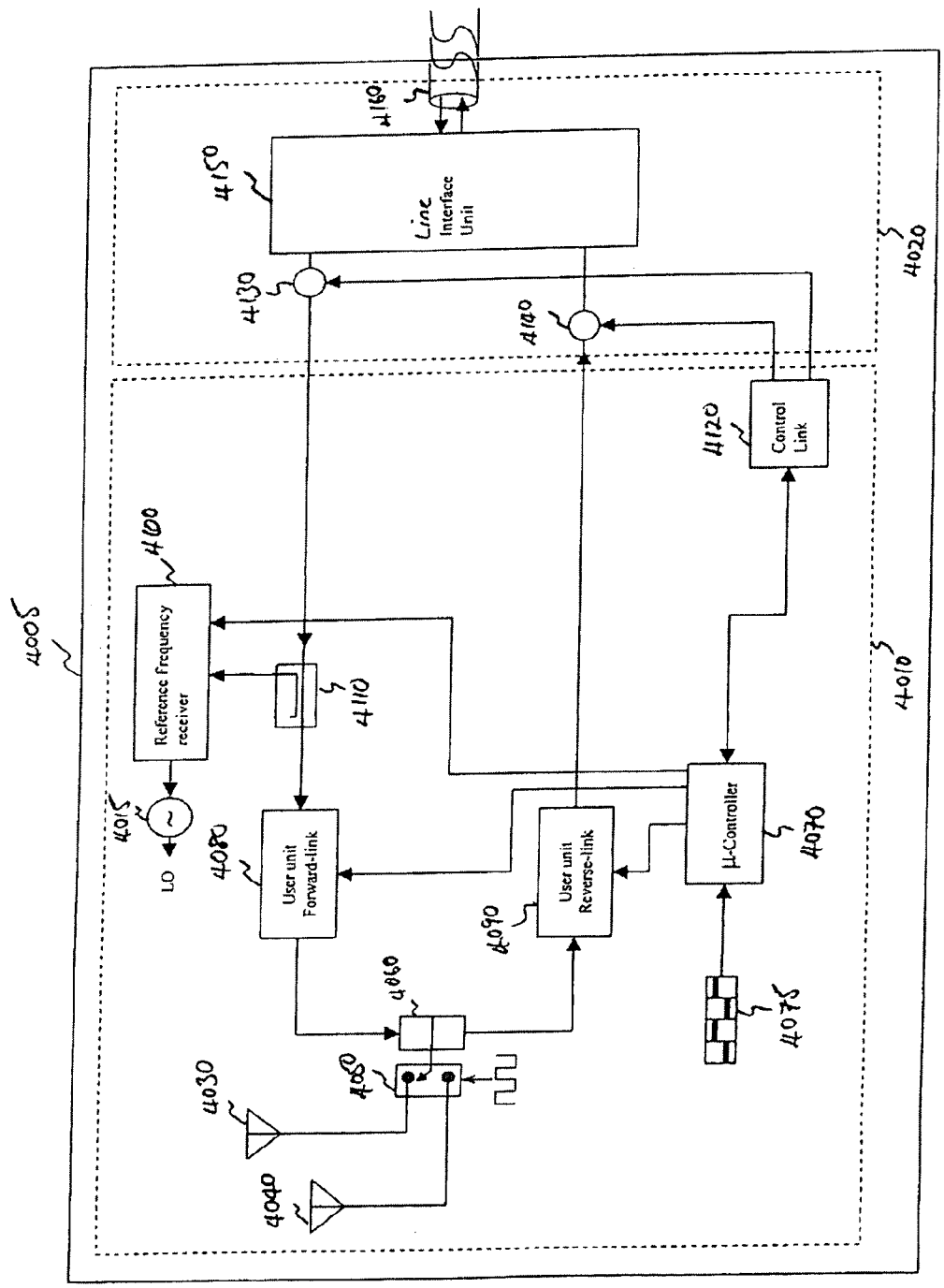

FIG. 20 shows an example of analogue implementation of the User unit 702 (FIG. 6) using a transmission cable as the physical medium for communication with the Network unit 3005 (602 in FIG. 5). The User unit 702 shown in FIG. 6 is modified to the unit 4005 shown in FIG. 20 to transmit to, and receive signals from, the Network unit 3005, which is a modified version of the Network unit 602 shown in FIG. 5, over a cable capable of supporting the operating bandwidth and the frequencies of the Network 3005 and User 4005 units signals. The cable interface unit 4020 consists of a line interface unit 4150 which is connected to the transmission/reception cable 4160 and two hybrid combiners 4130 on the forward-link and 4140 on the reverse link of the User sub unit 4010. The line interface unit 4150 will provide the means for the load matching for connection to a transmission line 4160, and other suitable components such as the amplifiers, modulation and frequency converters (modem functionalities), for reliable transmission over the transmission line 4160. The design of the line interface unit 4150 is dependent on the transmission line 4160 characteristics, and is well known in the art. For example, even the in-building power lines or telephone lines can be used as the transmission line 4160 (as in homePNA), where the line interface unit 4150 is designed for such operation. The hybrid combiner (or mixer or directional coupler) 4140 is used to combine the control link 4120 signal with the reverse-link signal. The hybrid combiner (or duplexer) 4130 is used to extract sufficient signal for reception and detection of control link 4120 received signal. It is also possible to use hybrid combiners instead of the directional coupler 4110. It is also possible, and is more desirable, to place the Forward-link Network unit 4080 internal LNA amplifier, before the directional coupler 4110 (or the hybrid combiner replacement), in diagram 20.

The operation of the units 4015, 4030, 4040, 4050, 4060, 4070, 4075, 4080, 4090, 4100, 4110 and 4120 in FIG. 20 is similar, in operation and description, to 722, 734, 736, 732, 730, 728, 721, 724, 726, 716, 718 and 720 respectively, as discussed for FIG. 6. In the modified User unit 4005, the directional coupler 4110 (718 in FIG. 6) is connected to hybrid combiner 4130, and the Reverse-link User unit 4090 (726 in FIG. 6) is connected to hybrid combiner 4140.

Apart from the mentioned differences, the operation of Network unit 3010 is similar to the operation of the Network unit 602 and the operation of User unit 4010 is similar to the operation of the User unit 702.

The control-flow description given for FIGS. 7, 8, 9, 10 and 11 can also be used for the digital implementation of the Network unit 3005 and User unit 4005, which is discussed above in FIGS. 19 and 20.

FIG. 40 shows an example of digital implementation of the Network unit 5005 (1002 in FIG. 12), using a transmission cable as the physical medium for communication with the User unit 6005 (2002 in FIG. 13). The Network unit 1002 shown in FIG. 12 is modified to the unit 5005 shown in FIG. 40 to transmit to, and receive signals from, the User unit 6005 (in FIG. 50), which is the modified version of the User unit 2002 shown in FIG. 13, over a cable capable of supporting the operating bandwidth and the frequencies of the Network 5005 and User 6005 units signals. The modified cable interface unit 5020 consists of a line interface unit 5220, which is connected to the transmission/reception cable 5210 and the Line Modem unit 5250.

The line interface unit 5220 and the Line Modem unit 5250 will provide the means for the load matching for connection to transmission line 5210, and other suitable components such as the amplifiers, modulation and frequency converters, for reliable transmission over the transmission line 5210. The design of the line interface unit 5220 is dependent on the transmission line 5210 characteristics, and is well known in the art. For example, even the in-building power lines or telephone lines can be used as the transmission line 5210 (as in homePNA), where the line interface unit 5220 is designed for such operation. The line modem unit 5250 may be used for modulation and demodulation AD/C, DA/C and all other modem functionalities for transmission of the signal generated by the unit 5010 and reception of signal generated by unit 6010. Also, the design of the modem unit 5250 is well known in the art, and as example technologies, homePNA and Home Networking can be mentioned. The line modem unit 5250 is connected to data muliplexer unit 5260 and data demultiplexer unit 5270. The line modem unit 5250 can be implemented in either analogue or digital technology (or a mix). In the example it is assumed that the line modem unit 5250 is implemented in digital domain.

Data multiplexer unit 5260 is also connected to Signal Conditioning unit 5110 and the control link unit 5145, and is used to multiplex control samples generated by control link unit 5145 and the signal samples generated by the Signal Conditioning unit 5110. The multiplexer unit 5260 can be integrated within the Signal Conditioning unit 5110. Alternatively, the output of the Signal Conditioning unit 5110 and control link unit 5140 can be separately connected to the line modem unit 5250, where they are modulated on adjacent carriers for simultaneous transmission to the User unit 6005.

Data Demultiplexer unit 5270 is also connected to Signal Conditioning unit 5130 and the control link unit 5145, and is used to demultiplex received control samples and the signal samples generated by the User unit 6005. The demultiplexer unit 5270 can be integrated within the Signal Conditioning unit 5130. Alternatively, the input to the Signal Conditioning unit 5130 and control link unit 5145 can be separately connected to the line modem unit 5250, if the control and data signals are modulated on adjacent carriers for simultaneous transmission by the User unit 6005.

In Network unit 5005, the calibration signal receiver unit (1016 in FIG. 12) is no longer implemented separately. As no analogue signal path is available in the reverse-link of the Network unit 5005, the calibration signal receiver unit (1016 in FIG. 12) is integrated and performed in the Signal Conditioning unit 5130.

The operation of the units 5110, 5120, 5130, 5140, 5141, 5145, 5300, 5100, 5150, 5090, 5160, 5080, 5170, 5070, 5180, 5190, 5060, 5050, 5040 and 5030 in FIG. 30 is similar, in operation and description, to 1022, 1024, 1048, 1060, 1061, 1062, 1070, 1020, 1050, 1018, 1052, 1014, 1054, 1012, 1056, 1058, 1010, 1008, 1004 and 1006 respectively, as discussed for FIG. 12.

FIG. 50 shows an example of digital implementation of the User unit 6005 (2002 in FIG. 13) using a transmission cable as the physical medium for communication with the Network unit 5005 (1002 in FIG. 12). The User unit 2002 shown in FIG. 13 is modified to the unit 6005, shown in FIG. 50, to transmit to, and receive signals from, the Network unit 5005, which is a modified version of the Network unit 1002, shown in FIG. 12, over a cable capable of supporting the operating bandwidth and the frequencies of the Network 5005 and User 6005 units signals. The modified cable interface unit 6020 consists of a line interface unit 6230 which is connected to the transmission/reception cable 6240 and the line modem unit 6220.

The line interface unit 6230 and the Line Modem unit 6220 will provide the means for the load matching for connection to transmission line 6240, and other suitable components such as the amplifiers, modulation and frequency converters, for reliable transmission over the transmission line 6240. The design of the line interface unit 6230 is dependent on the transmission line 6240 characteristics, and is well known in the art. For example, even the in-building power lines or telephone lines can be used as the transmission line 6240 (as in homePNA), where the line interface unit 6230 is designed for such operation. The line modem unit 6220 may be used for modulation and demodulation, AD/C, DA/C and all other functionalities for transmission of the signal generated by the unit 6010 and reception of signal generated by unit 5005. Also, the design of the modem unit 6220 is well known in the art, and as example technologies, homePNA and Home Networking can be mentioned. The line modem unit 6220 is connected to data muliplexer unit 6200 and data demultiplexer unit 6210. The line modem unit 6220 can be implemented in either analogue or digital technology (or a mix). In the example it is assumed that the line modem unit 6220 is implemented in digital domain.

Data multiplexer unit 6210 is also connected to Signal Conditioning unit 6140 and the control link unit 6150, and is used to multiplex control samples generated by control link unit 6150 and the signal samples generated by the Signal Conditioning unit 6140. The multiplexer unit 6210 can be integrated within the Signal Conditioning unit 6140. Alternatively, the output of the Signal Conditioning unit 6140 and control link unit 6150 can be separately connected to the line modem unit 6220, where they are modulated on adjacent carriers for simultaneous transmission to the Network unit 5005.

Data Demultiplexer unit 6200 is also connected to Signal Conditioning unit 6100 and the control link unit 6150, and is used to demultiplex received control samples and the signal samples generated by the User unit 5005. The demultiplexer unit 6200 can be integrated within the Signal Conditioning unit 6100. Alternatively, the input to the Signal Conditioning unit 6100 and control link unit 6150 can be separately connected to the line modem unit 6220, if the control and data signals are modulated on adjacent carriers for simultaneous transmission by the Network unit 5005.

The operation of the units 6150, 6100, 6110, 6140, 6155, 6151, 6120, 6130, 6090, 6160, 6170, 6080, 6180, 6070, 6190, 6060, 6050, 6030 and 6040 in FIG. 50 is similar, in operation and description, to 2056, 2020, 2022, 2046, 2054, 2055, 2021, 2023, 2024, 2044, 2042, 2026, 2040, 2028, 2038, 2030, 2032, 2034, and 2036 respectively, as discussed for FIG. 13.

Figure 21:
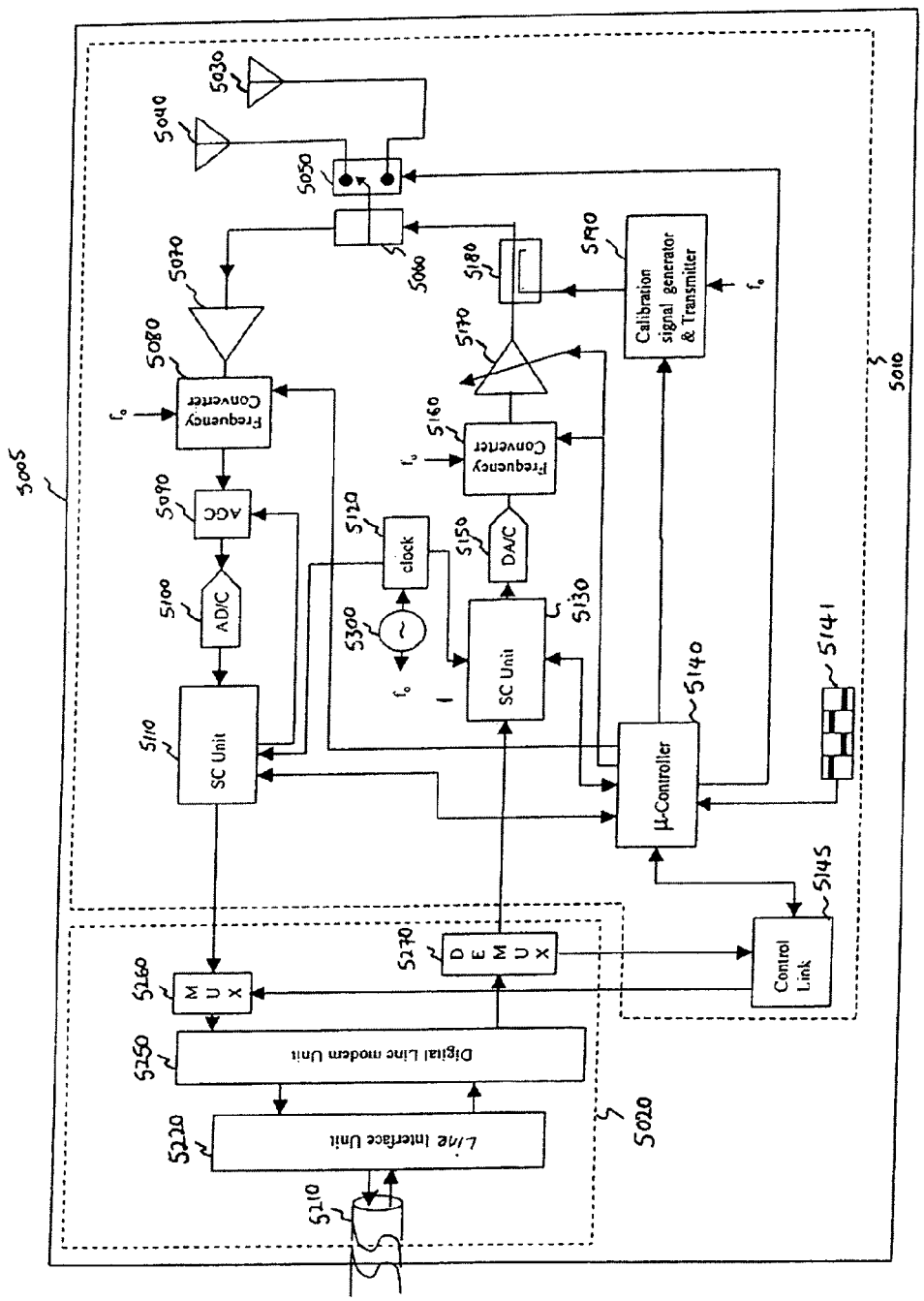
Figure 22:
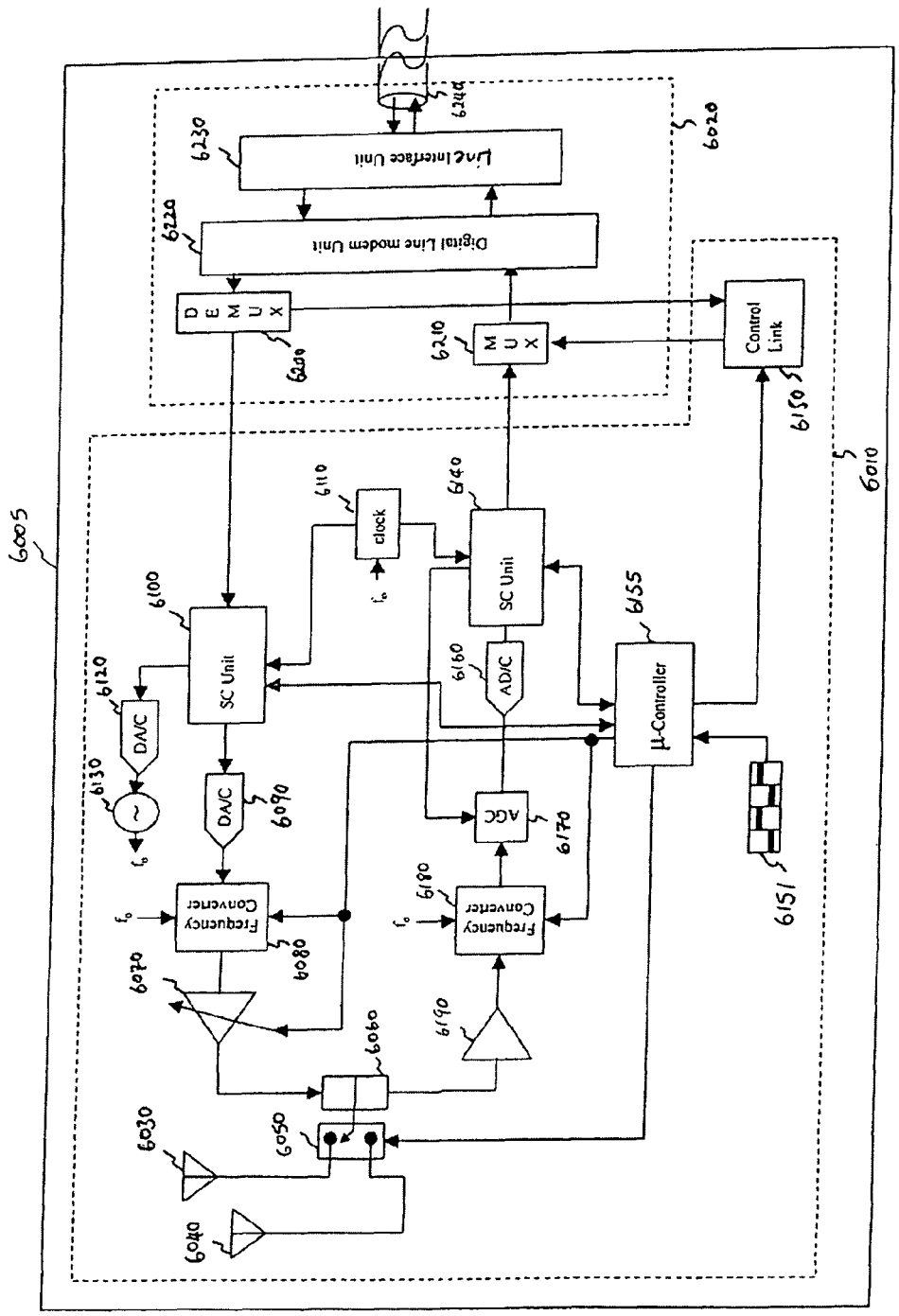

The control-flow description given for FIGS. 7, 8, 9, 10 and 11 can also be used for the digital implementation of the Network unit 5005 and User unit 6005, which is discussed above in FIGS. 21 and 22.

Apart from the mentioned differences, the operation of Network unit 5010 is similar to the operation of the Network unit 1002 and the operation of User unit 6010 is similar to the operation of the User unit 2002.

What is claimed is:

1. A repeater that mediates traffic between a network transceiver and a user transceiver in a wireless communication system, the repeater comprising:
   a network unit within the repeater that maintains a network link with the network transceiver, the network link being between the network transceiver and a first antenna attached to the network unit;
   a user unit within the repeater that maintains a user link with the user transceiver, the user link being between the user transceiver and a second antenna attached to the user unit;
   at least one amplifier that boosts a signal entering the repeater to provide a boosted signal;
   a two-way wireless communication pathway between the network unit and the user unit that facilitates communication of signals between the network transceiver and the user transceiver in autonomous repeater hops between the network transceiver and the network unit, between the user transceiver and the user unit, and the boosted signal between the network unit and the user unit;
   an echo canceller in each of the network and the user units, that mutually isolates the network unit and the user unit and operates in a frequency band of the boosted signal; and
   a gain controller that compensates for propagation losses by the boosted signal in the autonomous repeater hop of the two-way communication pathway between the network unit and the user unit.

2. The repeater according to claim 1 wherein:
   the network unit configured to be placed exterior to a structure;
   the user unit configured to be placed interior to the structure; and
   the gain controller compensates for indoor-outdoor propagation losses alone.

3. The repeater according to claim 1 wherein:
   the autonomous repeater hop between the network unit and the user unit on the communication pathway communicates on a carrier signal that is independent of signals communicated between the repeater and the network and user transceivers.

4. The repeater according to claim 1 wherein:
   the autonomous repeater hop between the network unit and the user unit on the communication pathway communicates at a carrier frequency that is independent of signals communicated between the repeater and the network and user transceivers.

5. The repeater according to claim 1 wherein:
   the autonomous repeater hop between the network unit and the user unit on the communication pathway communicates with a signal waveform that is independent of signal waveform communicated between the repeater and the network and user transceivers.

6. The repeater according to claim 1 further comprising:
   dedicated wireless data and/or control links in the communication pathway between the network unit and the user unit operating at unlicensed frequency bands.

7. The repeater according to claim 1 further comprising:
   dedicated wireless proprietary data and/or control links in the communication pathway between the network unit and the user unit operating at unlicensed frequency bands.

8. The repeater according to claim 1 further comprising:
   dedicated wireless data and/or control links in the communication pathway between the network unit and the user unit based on a wireless standard.

9. The repeater according to claim 1 further comprising:
   dedicated wire-line data and/or control links in the communication pathway between the network unit and the user unit selected from among links in a group consisting of electric wires, telephone lines, and coaxial cables.

10. The repeater according to claim 1 further comprising:
dedicated wire-line data and/or control links in the communication pathway between the network unit and the user unit based on a wireline standard.

11. The repeater according to claim 1 further comprising:
an inband or out-of-band control link in the communication pathway between the network unit and the user unit.

12. The repeater according to claim 1 further comprising:
a wireless control link in the communication pathway between the network unit and the user unit selected from among a group consisting of Bluetooth, any 802.11-based standard, and other wireless standards.

13. The repeater according to claim 1 further comprising:
a dedicated wireless or Wire-line proprietary control link in the communication pathway between the network unit and the user unit based on frequency tones.

14. The repeater according to claim 1 wherein the network unit and/or the user unit further comprises:
a pair of antennas; and
a switch connected to the antenna pair that performs switching operations for transmit/receive operations enabling switched antenna diversity in all or some repeater hops and communication links.

15. The repeater according to claim 1 further comprising:
local oscillators in the network unit and the user unit; and
a control and/or data link in the communication pathway from the network unit to the user unit that carries a synchronization signal to mutually synchronize the local oscillators.

16. The repeater according to claim 1 further comprising:
local oscillators in the network unit and the user unit that are synchronized using mains electricity signal oscillations to mutually synchronize the local oscillators.

17. The repeater according to claim 1 wherein:
the network unit and the user unit are assigned unique identification numbers.

18. The repeater according to claim 1 further comprising:
an identification and reference frequency unit that generates a Binary Phase Shift Keying (BPSK) signal modulated by the identification number, modulates the signal at a suitable part of the operating unlicensed spectrum band, and couples the signal into a transmitter pathway of a forward-link of the network unit.

19. The repeater according to claim 1 further comprising:
an identification and location unit that modulates identification and location information on a reverse link communication waveform by coded low bit-rate modulation, the modulation being amplitude modulation or Differential Quadrature Phase Shift Keying (DQPSK) modulation.

20. The repeater according to claim 1 further comprising:
a calibration signal generator/transmitter that generates a spread-spectrum signal for complex channel impulse response generation.

21. The repeater according to claim 1 further comprising:
a calibration signal generator/transmitter that generates a spread-spectrum signal for complex channel impulse response generation using a code generation technique selected from one or more techniques from among a group consisting of:
generating spread-spectrum waveforms by Pseudo Random, Gold, or other code known a priori to all units;
generating code phase of a known code to uniquely-identify all user units and all network units;
allocating codes or code phases by dynamic assignment strategies;
using more than one code for complex channel impulse response generation;
using more than one code phase for complex channel impulse response generation;
modulating the spread-spectrum signal by unit identifier; and
generating the spread-spectrum wave frequency in the operating cellular band or in an unlicensed band.

22. The repeater according to claim 1 further comprising:
at least one amplifier that boosts a desired signal entering the repeater in part or all of an allocated signal spectrum.

23. The repeater according to claim 1 further comprising:
the communication pathway between the network unit and the user unit has an operating band that is determined using a technique selected from one or more of a group consisting of preselecting the operating band, manually selecting the operating band, and automatically selecting the operating band based on detected signals.

24. The repeater according to claim 1 further comprising:
whereby the signal is from wireless systems selected from one or more of a group consisting of Global System for Mobile Communications (GSM) and all it's derivative systems, cdma2000 (Code Division Multiple Access), Wideband Code Division Multiple Access (WCDMA), and any other standards, and systems operating in cellular or wireless bands, as well as Global Positioning System (GPS).

25. The repeater according to claim 1 further comprising:
directional antennas capable of mutual isolation of the network unit and the user unit of the boosted signal operating in a boosted signal frequency band.

26. The repeater according to claim 1 further comprising:
the echo cancellers insert a delay in the autonomous repeater hop of the two-way communication pathway between the network unit and the user unit.

27. The repeater according to claim 1 wherein:
a reverse-link pathway in the communication pathway between the network unit and the user unit, and the reverse-link between the network unit and the network transceiver are gated based on signal presence to reduce interference and power consumption.

28. The repeater according to claim 1 wherein:
the network unit is configured to operate with a plurality of user units.

29. The repeater according to claim 1 wherein:
the network unit and user unit are attached and configured mechanically back-to-back in a single housing.

30. The repeater according to claim 1 wherein:
the repeater operates in an unlicensed frequency band and is capable of selecting an operating band at a frequency that does not interfere with other devices operating in the unlicensed frequency band.

* * * * *